US012638061B2

(12) United States Patent
Nakano

(10) Patent No.: US 12,638,061 B2
(45) Date of Patent: May 26, 2026

(54) DAMPING FORCE GENERATION MECHANISM AND PRESSURE SHOCK ABSORBER

(71) Applicant: Hitachi Astemo, Ltd., Hitachinaka (JP)

(72) Inventor: Gota Nakano, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 406 days.

(21) Appl. No.: 18/319,087

(22) Filed: May 17, 2023

(65) Prior Publication Data

US 2023/0287955 A1 Sep. 14, 2023

Related U.S. Application Data

(63) Continuation of application No. PCT/JP2020/047962, filed on Dec. 22, 2020.

(51) Int. Cl.
*F16F 9/512* (2006.01)
*F16F 1/02* (2006.01)
(Continued)

(52) U.S. Cl.
CPC ........ *F16F 9/5126* (2013.01); *F16F 2222/12* (2013.01)

(58) Field of Classification Search
CPC ...... F16F 9/5126; F16F 9/3484; F16F 9/3485; F16F 9/3482; F16F 9/3481; F16F 9/466;
(Continued)

(56) References Cited

U.S. PATENT DOCUMENTS 5,180,039 A * 1/1993 Axthammer .............. F16F 9/46
188/315
5,398,787 A 3/1995 Woessner et al.
(Continued)

FOREIGN PATENT DOCUMENTS

DE 102016110601 A1 8/2016
DE 112019001540 T5 10/2020
(Continued)

OTHER PUBLICATIONS

German Office Action dated May 5, 2025 for the corresponding German Patent Application No. 112020007623.7; 13 pages including English translation.
(Continued)

*Primary Examiner* — Robert A. Siconolfi
*Assistant Examiner* — James K Hsiao
(74) *Attorney, Agent, or Firm* — Leason Ellis LLP; Edward J. Ellis; Melvin C. Garner

(57) ABSTRACT
A damping force generation mechanism with a flow path inside thereof, through which a fluid flows, includes: a valve body part including an elastically deformable elastic part and a pressure receiving part receiving pressure of the fluid; a valve seat part provided around a flow path port of the flow path, with which the pressure receiving part is able to make contact; and a support part provided in a constituent part constituting at least a part of a back pressure chamber applying a back pressure toward the valve seat part to the valve body part, the support part supporting an outer edge portion of the elastic part.

17 Claims, 10 Drawing Sheets

(51) Int. Cl.
F16F 9/34 (2006.01)
F16F 9/46 (2006.01)

(58) Field of Classification Search
CPC ...... F16F 1/027; F16F 2222/12; F16F 9/3214; F16F 2230/36; F16F 9/348
See application file for complete search history.

(56) References Cited

U.S. PATENT DOCUMENTS

| | | | | |
|---|---|---|---|---|
| 7,395,907 | B2 * | 7/2008 | de Kock | F16F 9/512 |
| | | | | 188/316 |
| 7,562,750 | B2 * | 7/2009 | Lemmens | F16F 9/34 |
| | | | | 188/266.6 |
| 11,466,747 | B2 * | 10/2022 | Nakano | F16F 9/185 |
| 2005/0173214 | A1 * | 8/2005 | Lemmens | F16F 9/446 |
| | | | | 188/322.13 |
| 2008/0006493 | A1 * | 1/2008 | Jee | F16F 9/465 |
| | | | | 188/282.5 |
| 2008/0087512 | A1 | 4/2008 | Vanhees et al. | |
| 2008/0185246 | A1 * | 8/2008 | Park | F16F 9/3485 |
| | | | | 188/322.15 |
| 2009/0242339 | A1 * | 10/2009 | Nakadate | F16F 9/464 |
| | | | | 188/266.5 |
| 2011/0073424 | A1 * | 3/2011 | Murakami | F16F 9/465 |
| | | | | 188/322.13 |
| 2011/0147147 | A1 * | 6/2011 | Murakami | F16F 9/464 |
| | | | | 188/314 |
| 2011/0290603 | A1 * | 12/2011 | Yabe | F16F 9/46 |
| | | | | 188/282.1 |
| 2016/0356335 | A1 * | 12/2016 | Nomura | F16F 9/3485 |
| 2018/0135720 | A1 | 5/2018 | De Kock | |
| 2019/0368569 | A1 * | 12/2019 | Yamashita | F16F 9/348 |
| 2020/0208707 | A1 * | 7/2020 | Nakano | F16F 9/3484 |
| 2021/0102595 | A1 * | 4/2021 | Nakano | F16F 9/3485 |

FOREIGN PATENT DOCUMENTS

| | | | |
|---|---|---|---|
| JP | 04312227 | A | 11/1992 |
| JP | 2009281584 | A | 12/2009 |
| JP | 2010507047 | A | 3/2010 |
| JP | 2015217885 | A | 12/2015 |
| JP | 2016023776 | A | 2/2016 |

OTHER PUBLICATIONS

International Search Report mailed Feb. 16, 2021 for the corresponding International Patent Application No. PCT/JP2020/047962 ( 2 pages).

Japanese Office Action mailed Jun. 24, 2021 for the corresponding Japanese Patent Application No. 2020-573050 ( 9 pages including English Translation).

* cited by examiner

THE OTHER SIDE

AXIAL
DIRECTION

ONE SIDE

INSIDE ◄─────► OUTSIDE
RADIAL
DIRECTION

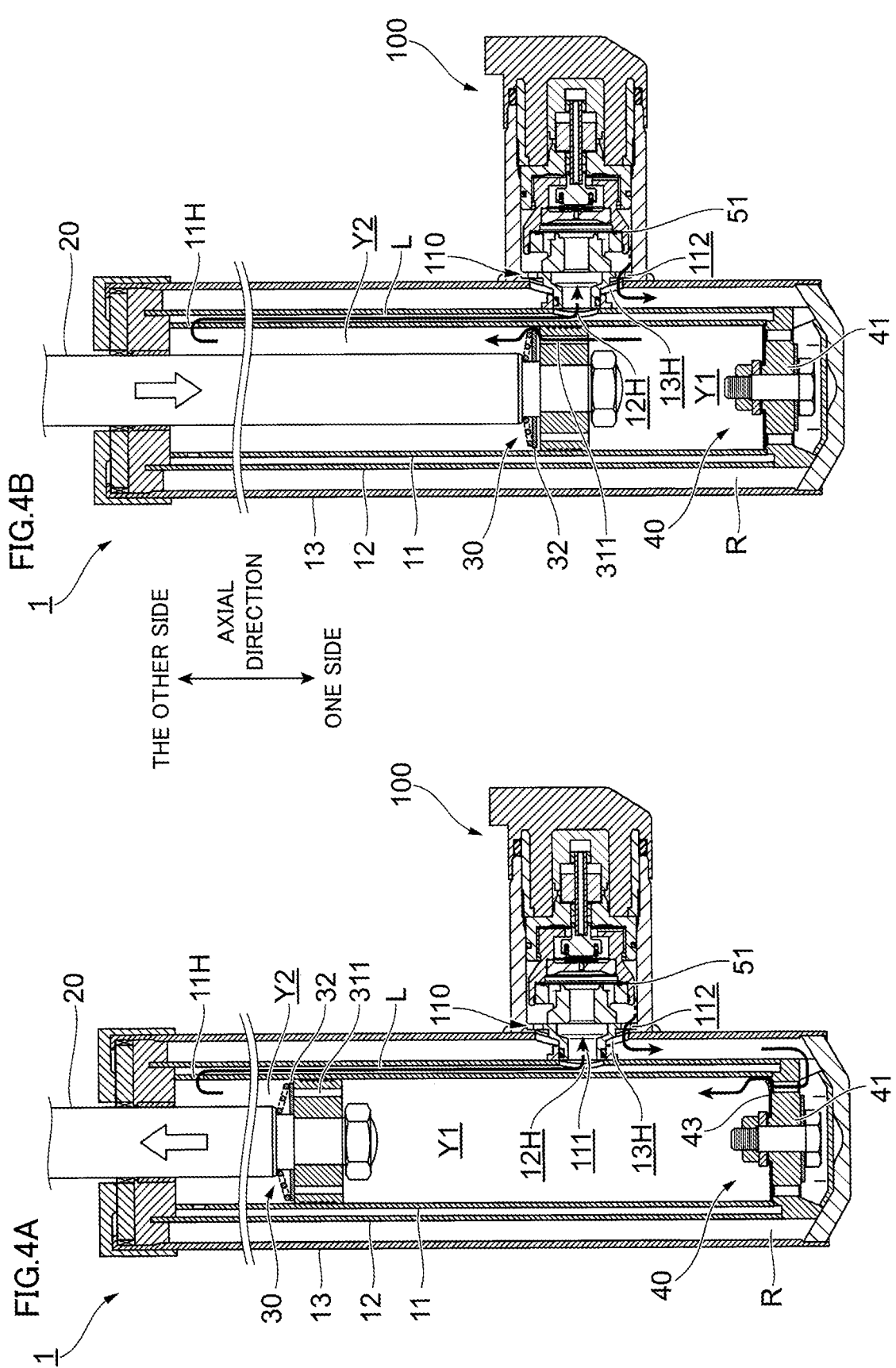

SECOND AXIAL DIRECTION

INSIDE ← → OUTSIDE

Figure 6:
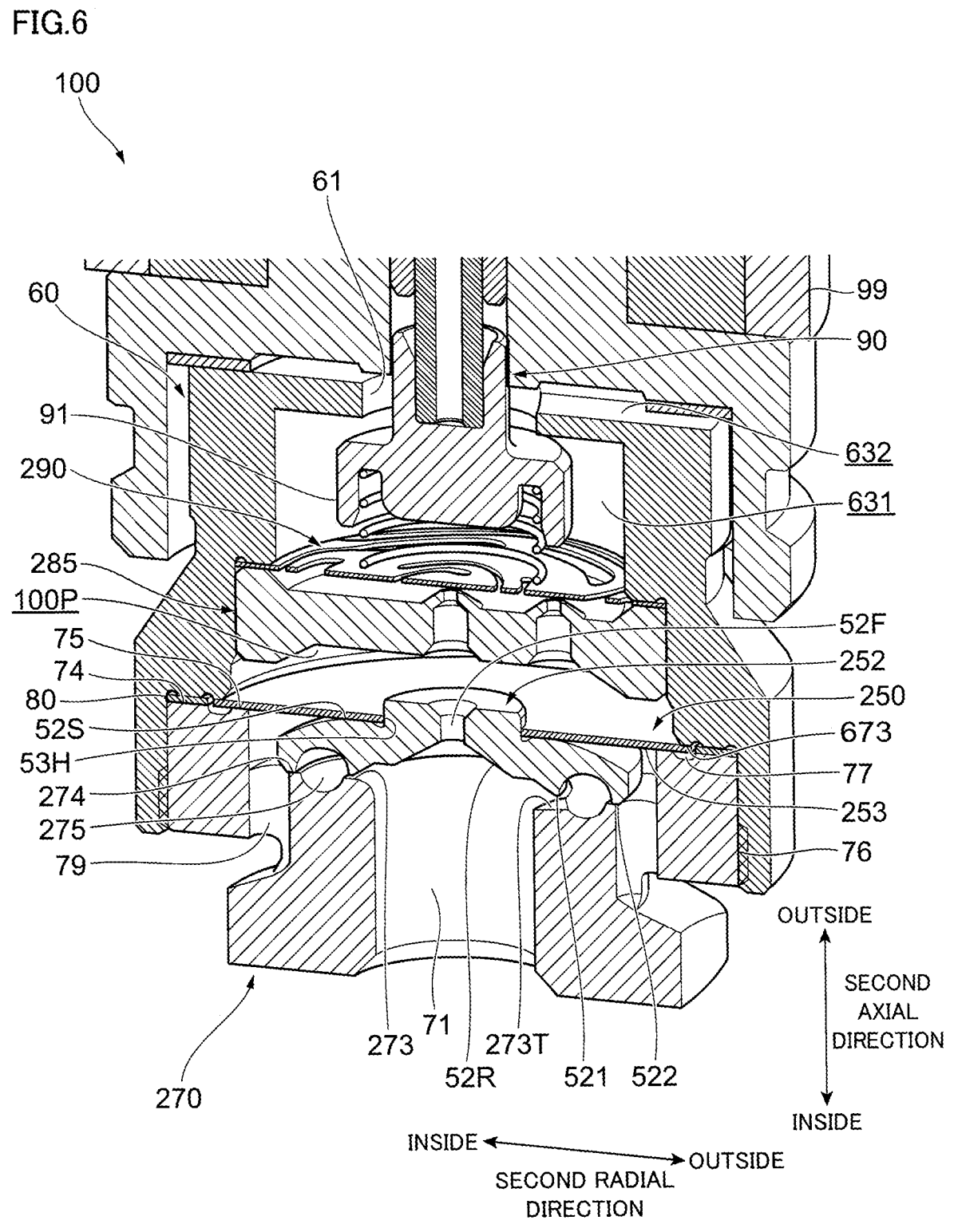

OUTSIDE

SECOND
AXIAL
DIRECTION

INSIDE 273 71 273T 52R 521 522

INSIDE ← → OUTSIDE
SECOND RADIAL
DIRECTION

FIG.9    1

THE OTHER SIDE

↕ AXIAL DIRECTION

ONE SIDE

20

10

11

12

Y2

230

Y1

R

40

INSIDE ←——→ OUTSIDE
RADIAL DIRECTION

DAMPING FORCE GENERATION MECHANISM AND PRESSURE SHOCK ABSORBER

CROSS REFERENCE TO RELATED APPLICATIONS

This application is a Continuation of International Patent Application No. PCT/JP2020/047962 filed on Dec. 22, 2020, the content of which is incorporated herein by reference in its entirety.

FIELD OF THE INVENTION

The present invention relates to a damping force generation mechanism and a pressure shock absorber.

BACKGROUND OF THE INVENTION

Some pressure shock absorbers and damping force generation mechanisms used in the pressure shock absorbers mounted between the vehicle body and the axle can generate variable damping force. Such a pressure shock absorber or a damping force generation mechanism includes, for example, a back pressure chamber, a pilot valve, and a solenoid that regulates valve-opening pressure of the pilot valve. Then, pressure is introduced into the back pressure chamber, and the pressure applies a force on a valve body in the direction that the valve body closes a flow path. In other words, the valve-opening pressure of the valve body is regulated by controlling the pressure. Then, regulation of the valve-opening pressure of the pilot valve with the solenoid can make the resistance imparted to the flow of fluid through the flow path variable, and can generate the desired damping force.

CITATION LIST

Patent Literature

Patent Document 1: Japanese Patent Application Laid-Open Publication No. 2009-281584

Technical Problem

For example, in Japanese Patent Application Laid-Open Publication No. 2009-281584, the force in the direction of closing the valve body is mainly the pressure in the back pressure chamber formed by a spool. However, the spool always acts in the direction of approaching the valve body by a plate spring. Accordingly, the spring force serves as a force that prevents separation from a valve seat.

Here, for example, in a damping force variable valve described in Japanese Patent Application Laid-Open Publication No. 2009-281584, the axial position of the inner circumference side of the plate spring, which is a fixed end, is determined by the dimensions in the axial direction of plural components such as a valve seat member, a sub valve body, a spool holding member, a spool, etc. Then, there is a possibility that the dimensional tolerances of the plural components accumulate to generate variations in the axial position of the plate spring. In such a case, there is a risk that the preload of the plate spring applied to the spool varies, and the force that prevents separation from the valve seat due to the spring force also varies; accordingly, there is a possibility of causing individual differences in mass-produced products.

An object of the present invention is to provide a damping force generation mechanism, etc. that reduces variations of damping force due to an individual difference.

SUMMARY OF THE INVENTION

Solution to Problem

Under the above object, the present invention provides a damping force generation mechanism with a flow path inside thereof, through which a fluid flows, including: a valve body part including an elastically deformable elastic part and a pressure receiving part receiving pressure of the fluid; a valve seat part provided around a flow path port of the flow path, with which the pressure receiving part is able to make contact; and a support part provided in a constituent part constituting at least a part of a back pressure chamber applying a back pressure toward the valve seat part to the valve body part, the support part supporting an outer edge portion of the elastic part.

Advantageous Effects of Invention

According to the present invention, it becomes possible to provide a damping force generation mechanism, etc. that reduces variations of damping force due to an individual difference.

BRIEF DESCRIPTION OF THE DRAWINGS

FIGS. 4A and 4B are operation illustration diagrams of the hydraulic shock absorber 1 in the first exemplary embodiment;

FIG. 6 is a perspective view of an outer damping part in a second exemplary embodiment, which is also a partial cross-sectional view;

DETAILED DESCRIPTION OF THE INVENTION

Hereinafter, exemplary embodiments according to the present invention will be described in detail with reference to attached drawings.

First Exemplary Embodiment

[Configuration and Function of Hydraulic Shock Absorber 1]

Figure 1:
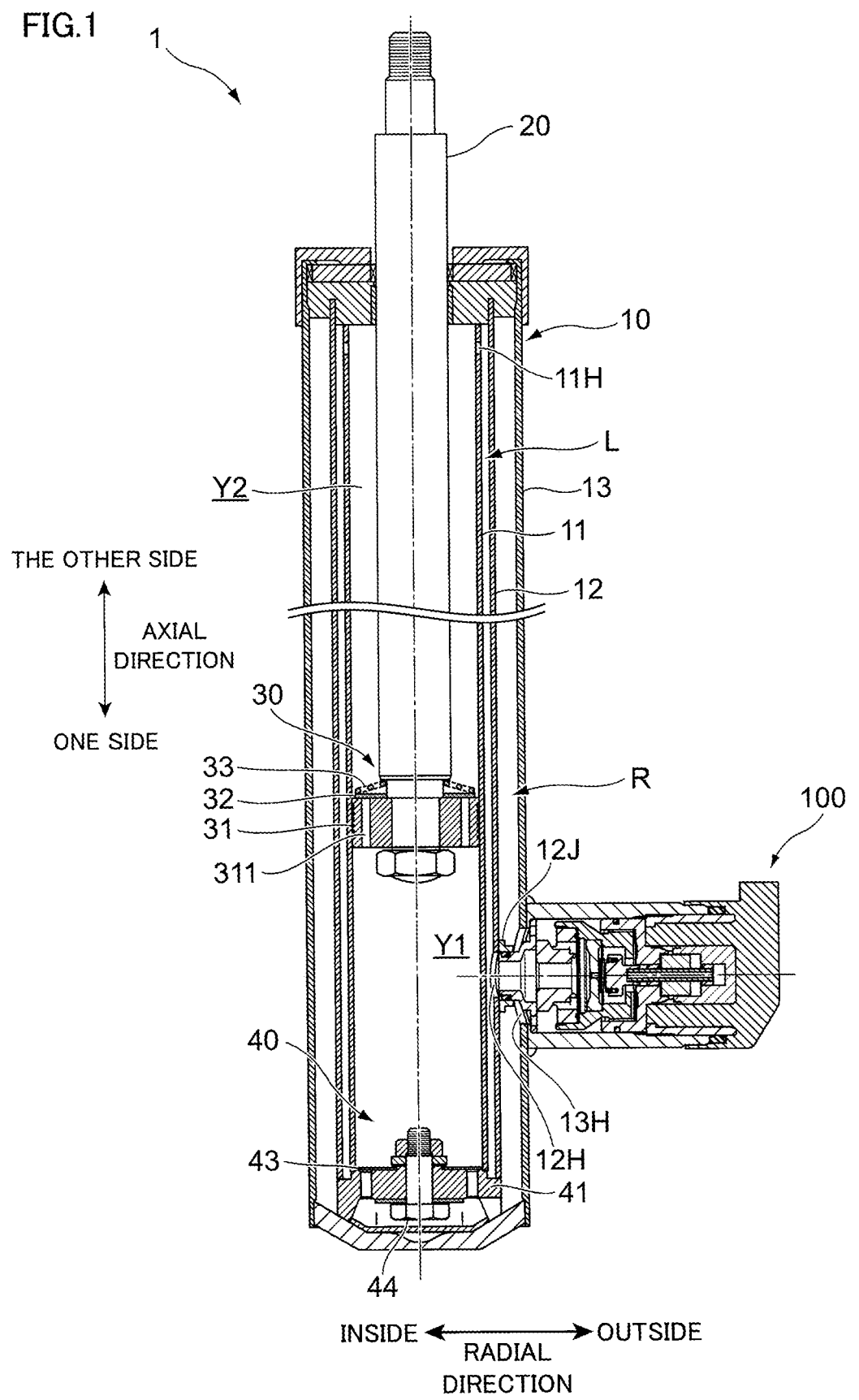
FIG. 1 is an overall view of a hydraulic shock absorber in a first exemplary embodiment.

FIG. 1 is an overall view of a hydraulic shock absorber 1 in the first exemplary embodiment.

As shown in FIG. 1, for example, the hydraulic shock absorber 1 (an example of a pressure shock absorber), which is mounted between the vehicle body and the axle, includes a cylinder part 10 containing oil (an example of a fluid) and a rod 20 with one end slidably inserted into the cylinder part 10 and the other end protruding from the cylinder part 10. In addition, the hydraulic shock absorber 1 includes a piston part 30 provided at one end of the rod 20 and a bottom part 40 provided at one end of the cylinder part 10. Furthermore, the hydraulic shock absorber 1 includes an outer damping part 100 provided outside the cylinder part 10 to generate a damping force.

Note that, in the description of the exemplary embodiment, the longitudinal direction of the cylinder part 10 shown in FIG. 1 is referred to as an "axial direction." In addition, the lower side of the cylinder part 10 in the axial direction is referred to as "one side" and the upper side of the cylinder part 10 is referred to as "the other side."

Moreover, the horizontal direction of the cylinder part 10 shown in FIG. 1 is referred to as a "radial direction." Then, in the radial direction, the center axis side is referred to as "inside in the radial direction," and the side moving away from the center axis side is referred to as "outside in the radial direction."

[Configuration and Function of Cylinder Part 10]

As shown in FIG. 1, the cylinder part 10 includes a cylinder 11 containing oil, an outer cylindrical body 12 provided at the outside in the radial direction of the cylinder 11, and a damper case 13 provided at further outside in the radial direction of the outer cylindrical body 12.

The cylinder 11 is formed cylindrically, and has a cylinder opening 11H on the other side.

The outer cylindrical body 12 is formed cylindrically. Then, the outer cylindrical body 12 forms a communication path L between the cylinder 11 and the outer cylindrical body 12. In addition, the outer cylindrical body 12 has an outer cylindrical body opening part 12H and an outer connection part 12J at a position facing the outer damping part 100. The outer connection part 12J has an oil flow path, and protrudes outward in the radial direction to form a connecting portion with the outer damping part 100.

The damper case 13 is formed cylindrically. The damper case 13 forms a reservoir chamber R, in which oil accumulates, between the outer cylindrical body 12 and the damper case 13. The reservoir chamber R absorbs oil in the cylinder 11 or supplies oil into the cylinder 11 as the rod 20 moves relative to the cylinder 11. In addition, the reservoir chamber R also collects oil flowing from the outer damping part 100. Moreover, the damper case 13 has a case opening part 13H at a position facing the outer damping part 100.

[Configuration and Function of Rod 20]

The rod 20 is a rod-like member extending long in the axial direction. The rod 20 connects to the piston part 30 on one side. In addition, the rod 20 connects to, for example, the vehicle body on the other side through a not-shown coupling member, etc. The rod 20 may be in a hollow state with a hollow inside, or in a solid state without a hollow inside.

[Configuration and Function of Piston Part 30]

The piston part 30 includes: a piston body 31 with plural piston oil ports 311; a piston valve 32 opening and closing the other side of the piston oil ports 311; and a spring 33 provided between the piston valve 32 and an end of the rod 20 on one side. Then, the piston part 30 divides the oil in the cylinder 11 into a first oil chamber Y1 and a second oil chamber Y2.

[Configuration and Function of Bottom Part 40]

The bottom part 40 includes a valve seat 41, a check valve part 43 provided on the other side of the valve seat 41, and a fastening member 44 provided in the axial direction. Then, the bottom part 40 separates the first oil chamber Y1 and the reservoir chamber R.

[Configuration and Function of Outer Damping Part 100]

Figure 2:
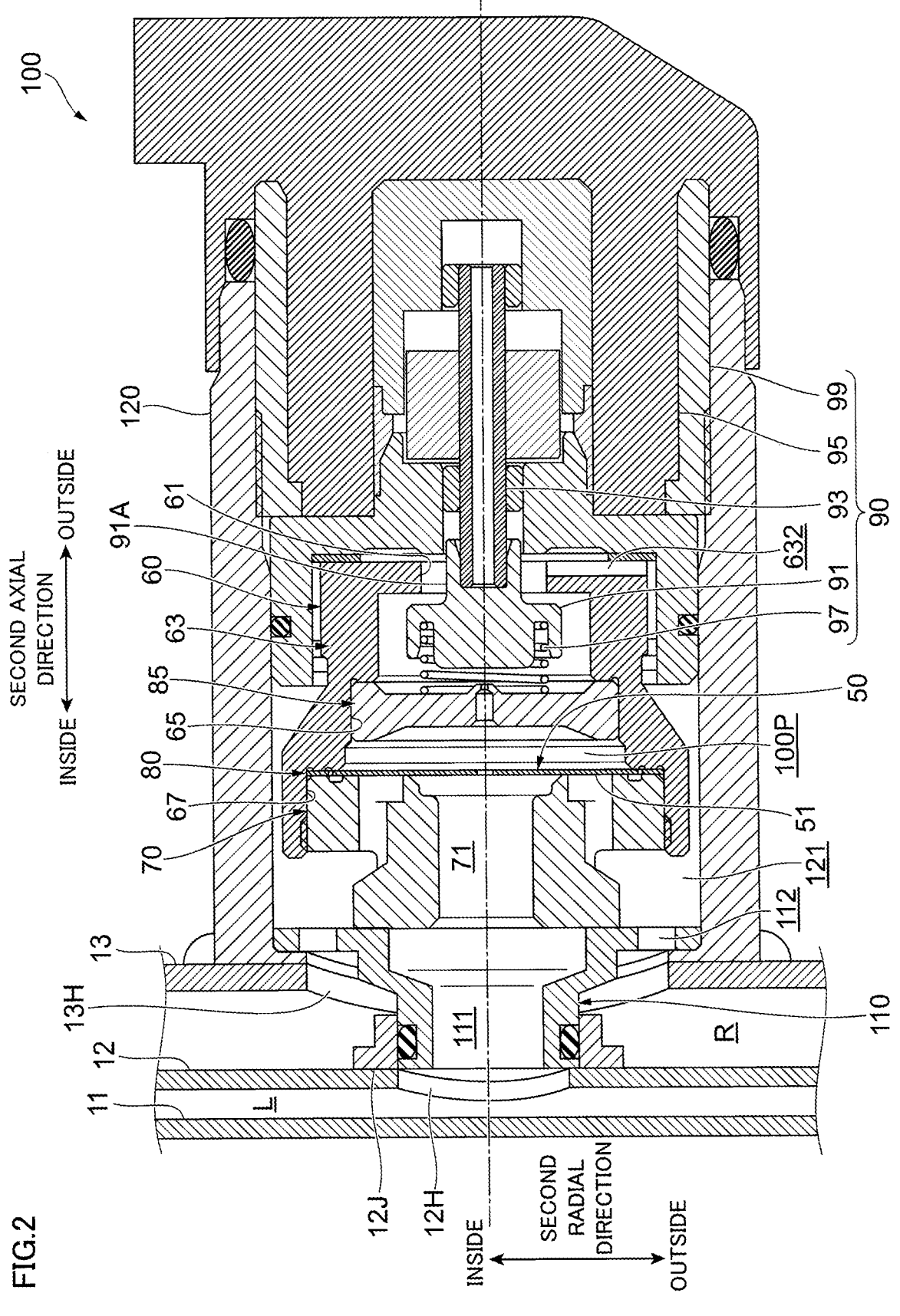
FIG. 2 is a cross-sectional view of an outer damping part in the first exemplary embodiment.

FIG. 2 is a cross-sectional view of the outer damping part 100 in the first exemplary embodiment.

Figure 3:
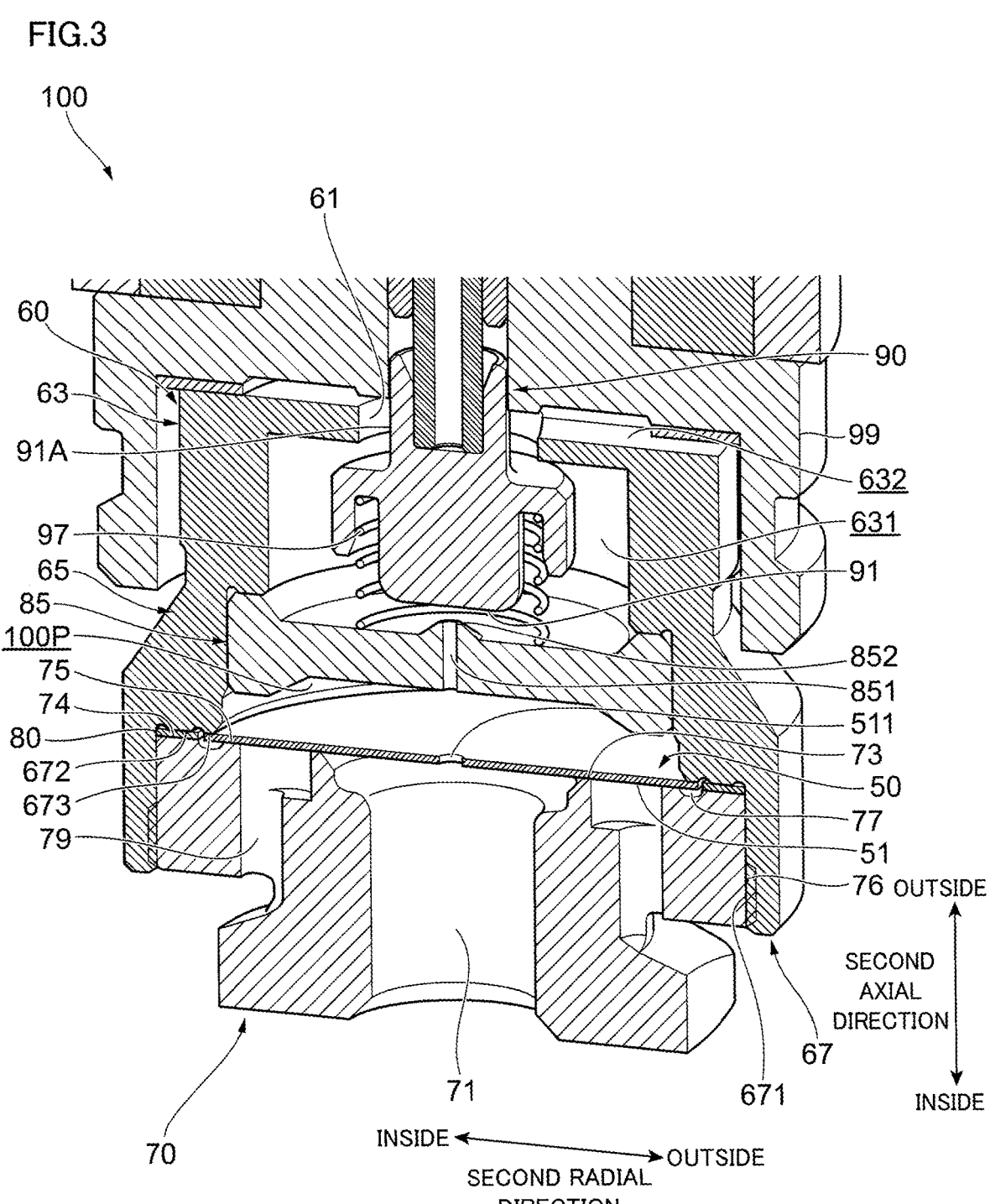
FIG. 3 is a perspective view of the outer damping part in the first exemplary embodiment, which is also a partial cross-sectional view.

FIG. 3 is a perspective view of the outer damping part 100 in the first exemplary embodiment, which is also a partial cross-sectional view.

In the following description, the longitudinal direction of the outer damping part 100 shown in FIG. 2 (that is, an intersecting direction intersecting the axial direction of the cylinder part 10 (refer to FIG. 1) (for example, substantially an orthogonal direction)) is referred to as a "second axial direction." In addition, in the second axial direction, the left side of the outer damping part 100 is referred to as "inside in the second axial direction," and the right side of the outer damping part 100 is referred to as "outside in the second axial direction."

Moreover, the vertical direction of the outer damping part 100 shown in FIG. 2 (that is, a direction intersecting the second axial direction) is referred to as a "second radial direction." Then, in the second radial direction, the center axis side along the second axial direction is referred to as "inside in the second radial direction," and the side moving away from the center axis along the second axial direction is referred to as "outside in the second radial direction."

As shown in FIG. 2, the outer damping part 100 (an example of a damping force generation mechanism) includes: a main valve part 50 that controls the oil flow; a first housing 60 that houses at least the main valve part 50; and a second housing 70 provided on an opposite side of the first housing 60 in the second axial direction. The outer damping part 100 further includes: a shim 80 provided between the first housing 60 and the second housing 70; an orifice plate 85 provided inside the first housing 60; and an adjustment part 90 that adjusts the oil pressure in a back pressure chamber 100P, which will be described later. The outer damping part 100 also includes: a connection flow path part 110 that forms the oil flow path from the communication path L to the main valve part 50; and an outer housing 120 that houses various components constituting the outer damping part 100.

(Main Valve Part 50)

The main valve part 50 includes a main valve 51 that mainly generates a damping force in the outer damping part 100.

The main valve 51 is formed into relatively thin plate shape, which is substantially circular. That is, the main valve 51 is formed into substantially a disc shape. In addition, as a material of the main valve 51, for example, metal such as iron can be used. The main valve 51 is then configured to be elastically deformable.

Then, as shown in FIG. 3, the main valve 51 is supported by the first housing 60 and the second housing 70 at an outer edge portion, which is at the outside in the second radial direction.

In addition, the main valve 51 is provided to be accessible to a valve seat part 73 of the second housing 70, which will be described later. The main valve 51 is subjected to pressure of oil flowing into a main flow path 71, which will be described later, at the inside in the second radial direction of the valve seat part 73. Then, the main valve 51 opens and closes the valve seat part 73 to control the flow rate of oil flowing through the main flow path 71. This causes the main valve 51 to generate a differential pressure and the damping force of the hydraulic shock absorber 1.

As described above, in the main valve part 50 (an example of a valve body part) in the first exemplary embodiment, the main valve 51 functions as an example of an elastic part and an example of a pressure receiving part. In other words, the main valve 51 of the main valve part 50 in the first exemplary embodiment includes the elastic part and the pressure receiving part that are configured in one piece.

The main valve 51 also includes an orifice part 511, through which the oil flows, at the inside in the second radial direction. The cross-sectional area of flow path of the orifice part 511 is formed sufficiently small as compared to, for example, the main flow path 71, which will be described later. Then, the orifice part 511 makes it possible for oil to flow from the main flow path 71 to the back pressure chamber 100P, which will be described later, even though the main valve 51 contacts the valve seat part 73 to close the main flow path 71.

(First Housing 60)

As shown in FIG. 2, the first housing 60 is provided mainly at the outside in the second axial direction with respect to the main valve 51. The first housing 60 can house the components such as the main valve 51 inside thereof and is provided in a cylindrical shape.

The first housing 60 includes: an opening part 61 provided at the outside in the second axial direction; a containing part 63 containing an adjustment valve 91, which will be described later, of the adjustment part 90; a holding part 65 holding the orifice plate 85, and a facing part 67 facing the second housing 70.

The opening part 61 has an inner diameter larger than a small diameter part 91A of the adjustment valve 91, which will be described later, of the adjustment part 90. Then, a gap through which the oil can flow is formed between the opening part 61 and the small diameter part 91A to be described later.

As shown in FIG. 3, the containing part 63 contains the adjustment valve 91, which will be described later, of the adjustment part 90, and a compression coil spring 97 inside thereof. In addition, the containing part 63 forms an inflow chamber 631, into which the oil flowing through an orifice flow path 851 of the orifice plate 85 flows. Furthermore, the containing part 63 includes an outflow path 632 that allows oil having flowed into the inflow chamber 631 to flow through the gap between the opening part 61 and the adjustment valve 91 to an in-housing flow path 121, which will be described later.

The outflow path 632 is formed along the second radial direction. In addition, in the first housing 60 of the first exemplary embodiment, plural outflow paths 632 are provided. Note that the outflow path 632 may be configured to function as an orifice when being pushed back to the outside in the second radial direction by the compression coil spring 97 in the case where the solenoid part 95 is not energized. With such a configuration, the outflow path 632 functions as a fail hole to keep the pressure in the back pressure chamber 100P, which will be described later, high to some extent.

The holding part 65 holds the orifice plate 85. Furthermore, the holding part 65 constitutes a part of the back pressure chamber 100P, which applies back pressure toward the valve seat part 73, which will be described later, to the main valve 51.

The back pressure chamber 100P is a chamber into which the oil flows from the orifice part 511, which will be described later, of the main valve 51. In addition, the oil in the back pressure chamber 100P can flow out through the orifice flow path 851 of the orifice plate 85. Then, the back pressure chamber 100P applies the back pressure to the main valve 51 in accordance with the oil pressure of the oil inside thereof.

Note that, in the outer damping part 100 of the first exemplary embodiment, the back pressure chamber 100P is formed by a plane at the inside in the second radial direction of the holding part 65 in the first housing 60, a plane at the inside in the second axial direction of the orifice plate 85, and a plane at the outside in the second axial direction of the main valve 51.

The facing part 67 includes: a first connection part 671 that connects to the second housing 70; a first shim contact part 672 that contacts a surface of the shim 80 facing outward in the second axial direction; and a first valve contact part 673 that contacts a surface of the main valve 51 facing outward in the second axial direction.

The first connection part 671 forms a location in the second housing 70 to hold the first housing 60. The first housing 60 (an example of a first containing part) of the first exemplary embodiment is configured to be divisible with respect to the second housing 70 (an example of a second containing part) in the second axial direction. Then, the first connection part 671 holds and fastens the second housing 70 not to move in the second axial direction relative to the first housing 60. The fastening method may be, for example, screw fastening or press fitting.

The first shim contact part 672 is an annular surface facing inward in the second axial direction. The first shim contact part 672 opposes a surface of the shim 80 facing outward in the second axial direction. Then, the first shim contact part 672 contacts the surface of the shim 80 facing outward in the second axial direction.

The first valve contact part 673 is an annular surface facing inward in the second axial direction. The first valve contact part 673 faces an end portion of the main valve 51 at the outside in the second radial direction. Then, the first valve contact part 673 supports the outer edge portion of the main valve 51. The first valve contact part 673 can push the main valve 51 against the valve seat part 73, which will be described later, of the second housing 70. In addition, the first valve contact part 673 serves as a fulcrum for deformation of the main valve 51 in the valve-opening state in which the main valve 51 opens the main flow path 71.

As described above, in the first housing 60 (an example of a constituent part) of the first exemplary embodiment, the holding part 65 constitutes at least part of the back pressure chamber 100P that applies the back pressure toward the valve seat part 73 to the main valve 51 (an example of the valve body part). Furthermore, the first valve contact part 673 of the first housing 60 contacts the outer edge portion of the surface of the main valve 51 facing outward in the second axial direction.

Thus, in the outer damping part 100 of the first exemplary embodiment, the first housing 60 constituting at least part of the back pressure chamber 100P supports the outer edge portion of the main valve 51.

(Second Housing 70)

The second housing 70 is provided mainly at the inside in the second axial direction of the main valve 51. The second housing 70, together with the first housing 60, can house components such as the main valve 51.

As shown in FIG. 3, the second housing 70 includes: the main flow path 71 through which the oil flows; and the valve seat part 73 provided at the end portion at the outside in the second axial direction of the main flow path 71. In addition, the second housing 70 includes: a second shim contact part 74 that contacts a surface of the shim 80 facing inward in the second axial direction; and a second valve contact part 75 (an example of a contact part) that contacts a surface of the main valve 51 facing inward in the second axial direction. Furthermore, the second housing 70 includes: a second connection part 76 that connects to the first housing 60; a groove part 77 facing the outer edge portion of the surface of the main valve 51 facing inward in the second axial direction; and an outer flow path 79 provided outside the main flow path 71 in the second radial direction.

Consequently, the shim 80 of the first exemplary embodiment is supported by being brought into contact at the outside in the second axial direction with the first shim contact part 672, and at the inside in the second axial direction with the second shim contact part 74. In addition, the main valve 51 of the first exemplary embodiment is supported by being brought into contact at the outside in the second axial direction with the first valve contact part 673, and at the inside in the second axial direction with the second valve contact part 75.

Note that, in the present application, "supported" means to be kept within a prescribed scope; therefore, sometimes there are both cases in which the object to be "supported" is "fixed" and "movable."

The second housing 70 also functions as an example of a flow path forming part.

The main flow path 71 is formed at the inside in the second radial direction of the second housing 70 along the second axial direction. The main flow path 71 connects to an inner flow path 111, which will be described later, of the connection flow path part 110 at the inside in the second axial direction. In addition, at the outside in the second axial direction, the main flow path 71 faces the surface of the main valve 51 facing inward in the second axial direction.

The valve seat part 73 is provided at the end portion of the main flow path 71 at the outside in the second axial direction. The valve seat part 73 is formed by an annular surface facing outward in the second axial direction. In other words, the valve seat part 73 is configured in one piece in the second housing 70. In addition, in the first exemplary embodiment, the valve seat part 73 is formed so that the protruding height of the valve seat part 73 is substantially the same as the second valve contact part 75. Then, the valve seat part 73 forms a portion where the main valve 51 contacts. That is, the main valve 51 (an example of the elastic part) is supported also by the valve seat part 73.

In the outer damping part 100 of the first exemplary embodiment, the main valve 51 contacts the entire circumference of the valve seat part 73, to thereby cause a valve-closing state in which the main valve 51 closes the main flow path 71. In addition, in the outer damping part 100 of the first exemplary embodiment, the main valve 51 is separated from the valve seat part 73, to thereby cause the valve-opening state in which the main valve 51 opens the main flow path 71.

The second shim contact part 74 is an annular surface facing outward in the second axial direction. The second shim contact part 74 opposes a surface of the shim 80 facing inward in the second axial direction. Then, the second shim contact part 74 contacts the surface of the shim 80 facing inward in the second axial direction.

The second valve contact part 75 is an annular surface facing outward in the second axial direction. The second valve contact part 75 is provided outside of the valve seat part 73 in the second radial direction. In addition, the second valve contact part 75 is provided inside of the first valve contact part 673 of the first housing 60 in the second radial direction. The second valve contact part 75 contacts the end portion of the main valve 51 (an example of the elastic part) at the outside in the second radial direction.

In the second axial direction, the end portion of the second valve contact part 75 at the outside in the second axial direction can be set at substantially the same height position as the end portion of the valve seat part 73 at the outside in the second axial direction. In addition, in the second axial direction, the end portion of the second valve contact part 75 at the outside in the second axial direction may be positioned more inside in the second axial direction than the end portion of the valve seat part 73 on the outside in the second axial direction.

Note that the second valve contact part 75 is not an indispensable configuration, but it is preferable to provide the second valve contact part 75 from the viewpoint of, for example, preventing excessive bending of the main valve 51.

The groove part 77 (an example of a concave part) is an annular groove concaved inward in the second axial direction. The groove part 77 is provided outside of the second valve contact part 75 (an example of the contact part) in the second radial direction with respect to the main valve 51 (an example of the elastic part). Then, the groove part 77 opposes the outer edge portion of the surface of the main valve 51 facing inward in the second axial direction. In addition, in the first exemplary embodiment, the groove part 77 is provided at a position facing the first valve contact part 673 across the main valve 51 in the second axial direction. In the valve-opening state in which the main valve 51 opens the main flow path 71, the groove part 77 then forms a region for making the end portion of the main valve 51 displaceable inwardly in the second axial direction.

The outer flow path 79 is formed along the second axial direction, to thereby form a flow path through which the oil flows. The first exemplary embodiment is provided with plural outer flow paths 79. Then, the outer flow path 79 forms a route for the oil, which has flowed from the main flow path 71 upon opening the main valve 51, when flowing toward the in-housing flow path 121 to be described later.

(Shim 80)

The shim 80 is an annular member that opens at the inside in the second radial direction. The thickness of the shim 80 in the first exemplary embodiment is substantially the same as that of the main valve 51. The shim 80 has a gap with the main valve 51, and is provided outside of the main valve 51 in the second radial direction.

The shim 80 then regulates the movement of the main valve 51 in the second radial direction.

In addition, the shim 80 (an example of a setting part) is disposed to be inserted between the first housing 60 and the second housing 70 in the second axial direction. With the thickness thereof, the shim 80 can also determine the spacing between the first valve contact part 673 and the second valve contact part 75 or the valve seat part 73 in the second axial direction, namely, the moving range of the main valve 51 in the second axial direction.

The shim 80 determines the state of supporting the main valve 51 by the first housing 60 and the second housing 70.

The shim 80 can easily change the mode of supporting the main valve 51 by the first housing 60 and the second housing 70, for example, by only changing the thickness of the shim 80 as the design thereof.

(Orifice Plate 85)

The orifice plate 85 is formed into substantially a circular and plate-like shape. The orifice plate 85 is then press fit into the inside of the first housing 60 and held by the holding part 65.

The orifice plate 85 includes: the orifice flow path 851 through which the oil flows; and a round part 852 provided at the end portion of the orifice flow path 851 on the outside in the second axial direction.

The orifice flow path 851 is provided at the inside in the second radial direction of the orifice plate 85 along the second axial direction. In addition, the orifice flow path 851 penetrates through the orifice plate 85. The cross-sectional area of flow path of the orifice flow path 851 is smaller than that of the orifice part 511 of the main valve 51, for example. Then, the orifice flow path 851 connects to the back pressure chamber 100P at the inside in the second axial direction, and connects to the inflow chamber 631 at the outside in the second axial direction.

The round part 852 is formed at the outside of the orifice flow path 851 in the second axial direction to surround the orifice flow path 851. In addition, the round part 852 is formed from the orifice plate 85 to protrude to a predetermined height toward the outside in the second axial direction. Then, the round part 852 forms a contact portion with the adjustment valve 91, which will be described later, of the adjustment part 90.

(Adjustment Part 90)

As shown in FIG. 2, the adjustment part 90 includes: the adjustment valve 91 that controls oil flow in the orifice flow path 851 (refer to FIG. 3) of the orifice plate 85; a plunger 93 connected to the adjustment valve 91; and the solenoid part 95 that drives the plunger 93. In addition, the adjustment valve 91 includes a connection portion with the plunger 93, and has the small diameter part 91A with a diameter smaller than that of the other portion of the adjustment valve 91. The adjustment part 90 also includes: the compression coil spring 97 provided between the orifice plate 85 and the adjustment valve 91; and a case part 99 that contains each component constituting the adjustment part 90.

As shown in FIG. 3, the adjustment valve 91 is provided at a position facing the round part 852 of the orifice plate 85 in the second axial direction. In addition, the adjustment valve 91 is movable in the second axial direction. Then, the adjustment valve 91 can contact the round part 852 of the orifice plate 85 by moving inward in the second axial direction. Thus, the adjustment valve 91 can take arbitrary state from the state of contacting the round part 852 to the state of the longest distance from the round part 852. This makes it possible for the adjustment valve 91 to adjust the flow rate of oil flowing through the orifice flow path 851 of the orifice plate 85.

As shown in FIG. 2, the plunger 93 is a rod-shaped member formed along the second axial direction. In addition, the plunger 93 functions as a moving core. The plunger 93 holds the adjustment valve 91 at the inside in the second axial direction. The plunger 93 is pushed inward in the second axial direction together with the adjustment valve 91 by the solenoid part 95 when the solenoid part 95 is energized. On the other hand, the plunger 93 is pushed back outwardly in the second axial direction together with the adjustment valve 91 by the compression coil spring 97 when the solenoid part 95 is not energized.

The solenoid part 95 includes a coil and a fixed core. Upon being energized, the solenoid part 95 then pushes the plunger 93 inwardly in the second axial direction.

The compression coil spring 97 contacts the orifice plate 85 at the inside in the second axial direction, and contacts the adjustment valve 91 at the outside in the second axial direction. Then, the compression coil spring 97 applies a force to the adjustment valve 91 in the direction in which the adjustment valve 91 is separated from the orifice plate 85.

The case part 99 contains the plunger 93 and the solenoid part 95 inside thereof. In addition, the case part 99 is subjected to the screw fastening with the outer housing 120.

(Connection Flow Path Part 110)

As shown in FIG. 2, the connection flow path part 110 includes: the inner flow path 111 provided at the inside in the second radial direction; and an outer flow path 112 provided at the outside in the second radial direction.

The inner flow path 111 connects to the outer cylindrical body opening part 12H at the inside in the second axial direction, and connects to the main flow path 71 of the second housing 70 at the outside in the second axial direction.

There are plural outer flow paths 112. Then, the outer flow path 112 connects to the case opening part 13H at the inside in the second axial direction, and connects to the in-housing flow path 121, which will be described later, at the outside in the second axial direction.

(Outer Housing 120)

The outer housing 120 shown in FIG. 2 is substantially a cylindrical member. The outer housing 120 is fastened to the damper case 13, for example by welding, at the inside in the second axial direction.

In addition, the outer housing 120 forms the in-housing flow path 121, which is the oil flow path in the outer housing 120, at the outside of the second housing 70 in the second radial direction.

[Operation of Hydraulic Shock Absorber 1]

Next, the operation of the hydraulic shock absorber 1 configured as mentioned above will be described concretely.

FIGS. 4A and 4B are operation illustration diagrams of the hydraulic shock absorber 1 in the first exemplary embodiment.

Note that FIG. 4A shows the oil flow during an extension stroke, and FIG. 4B shows the oil flow during a compression stroke.

First, the operation of the hydraulic shock absorber 1 during the extension stroke will be described.

As shown in FIG. 4A, during the extension stroke, the rod 20 moves to the other side with respect to the cylinder 11. At this time, the piston valve 32 remains closing the piston oil ports 311. In addition, the movement of the piston part 30 to the other side reduces the volume of the second oil chamber Y2. Then, the oil in the second oil chamber Y2 flows from the cylinder opening 11H to the communication path L.

Furthermore, the oil flows through the communication path L and the outer cylindrical body opening part 12H, and flows into the outer damping part 100. Then, in the outer damping part 100, the oil first flows into the inner flow path 111 of the connection flow path part 110. After that, in the outer damping part 100, the damping force is generated at the main valve 51. Note that the flow of oil at this time will be described in detail later.

Thereafter, the oil having flowed through the main valve 51 then flows into the in-housing flow path 121. Furthermore, the oil flows through the outer flow path 112 of the connection flow path part 110, and flows into the reservoir chamber R from the case opening part 13H.

In addition, the pressure in the first oil chamber Y1 becomes lower relative to the reservoir chamber R. Therefore, the oil in the reservoir chamber R flows into the first oil chamber Y1 through the bottom part 40.

Next, the operation of the hydraulic shock absorber 1 during the compression stroke will be described.

As shown in FIG. 4B, during the compression stroke, the rod 20 moves to the one side relative to the cylinder 11. In the piston part 30, the differential pressure between the first oil chamber Y1 and the second oil chamber Y2 opens the piston valve 32 that closes the piston oil ports 311. The oil in the first oil chamber Y1 then flows into the second oil chamber Y2 through the piston oil ports 311. Here, the rod 20 is disposed in the second oil chamber Y2. Therefore, the oil flowing from the first oil chamber Y1 to the second oil chamber Y2 becomes excessive by the volume of the rod 20. Accordingly, the oil of the amount equivalent to the volume of the rod 20 flows from the cylinder opening 11H to the communication path L.

Furthermore, the oil flows through the communication path L and the outer cylindrical body opening part 12H, and flows into the outer damping part 100. Note that the flow of the oil in the outer damping part 100 is the same as the flow of the oil during the extension stroke described above. In other words, in the hydraulic shock absorber 1 of the first exemplary embodiment, the direction of the oil flow in the outer damping part 100 is the same in both the compression stroke and the extension stroke.

As described above, in the hydraulic shock absorber 1 of the first exemplary embodiment, the damping force is generated in the outer damping part 100 in both the compression stroke and the extension stroke.

Subsequently, the oil flow in the outer damping part 100 of the first exemplary embodiment will be described in detail.

Figures 5A, 5B:
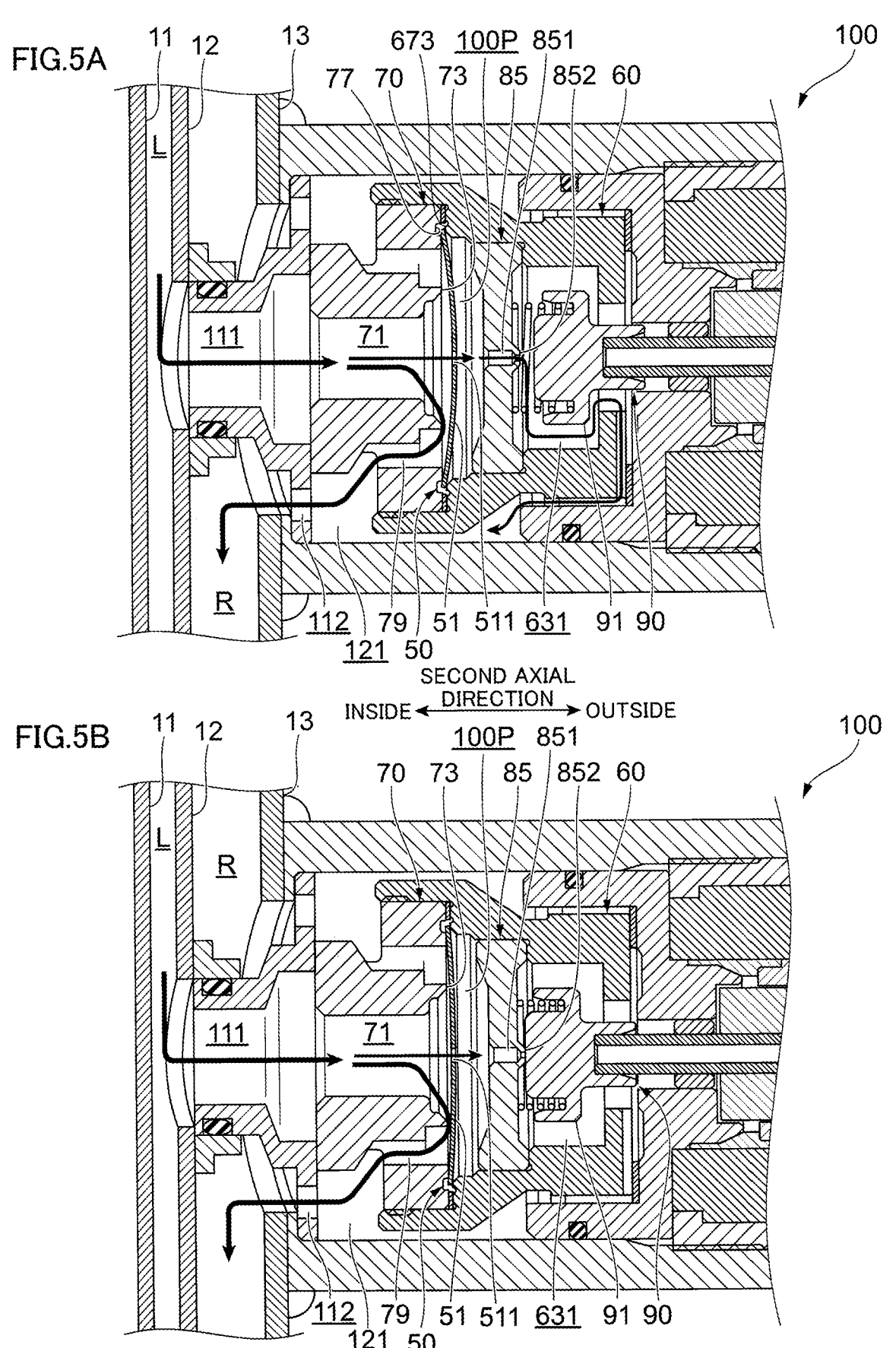
FIGS. 5A and 5B are illustration diagrams of oil flow in the outer damping part in the first exemplary embodiment.

FIGS. 5A and 5B are illustration diagrams of the oil flow in the outer damping part 100 of the first exemplary embodiment.

Note that FIG. 5A is an illustration diagram of the outer damping part 100 when the damping force generated by the main valve 51 is adjusted relatively low by the adjustment part 90. In addition, FIG. 5B is an illustration diagram of the outer damping part 100 when the damping force generated by the main valve 51 is adjusted relatively high by the adjustment part 90.

First, the operation of the adjustment part 90, which adjusts the pressure of the oil in the back pressure chamber 100P, will be described. In the first exemplary embodiment, the distance of the adjustment valve 91 to the orifice plate 85 varies depending on the amount of current flowing through the solenoid part 95 (refer to FIG. 2). Note that the control of the amount of current flowing through the solenoid part 95 is performed based on, for example, an ECU (Electronic Control Unit) that performs various kinds of controls in a vehicle. As the adjustment part 90 passes more current through the solenoid part 95, the adjustment valve 91 is closer to the round part 852 of the orifice plate 85. On the other hand, as the adjustment part 90 passes relatively less current through the solenoid part 95, the adjustment valve 91 moves further away from the round part 852 of the orifice plate 85.

Then, the ECU, for example, reduces the amount of current of the solenoid part 95 of the adjustment part 90 to a relatively small amount. Note that, in this example, the amount of current passed to the solenoid part 95 is set to zero. This positions the adjustment valve 91 further away from the round part 852, as shown in FIG. 5A. This makes it easier for the oil in the back pressure chamber 100P to flow from the orifice flow path 851 of the orifice plate 85 to the inflow chamber 631. In this case, the pressure of the oil in the back pressure chamber 100P is relatively low.

On the other hand, the ECU, for example, increases the amount of current of the solenoid part 95 of the adjustment part 90 to a relatively large amount. This positions the adjustment valve 91 close to the round part 852, as shown in FIG. 5B. This makes it difficult for the oil in the back pressure chamber 100P to flow from the orifice flow path 851 of the orifice plate 85 to the inflow chamber 631. In this case, the pressure of the oil in the back pressure chamber 100P is relatively high.

Then, the adjustment part 90 of the first exemplary embodiment can arbitrarily adjust the spacing between the round part 852 of the orifice plate 85 and the adjustment valve 91 within a predetermined range in accordance with the amount of current passed to the solenoid part 95. The adjustment part 90 can adjust the oil in the back pressure chamber 100P to a predetermined pressure in accordance with the amount of current passed to the solenoid part 95.

Subsequently, the oil flow that opens the main valve 51 will be specifically described.

As shown in FIG. 5A, the movement of the piston part 30 (refer to FIG. 1) in the axial direction causes the oil having flowed into the inner flow path 111 to flow into the main flow path 71.

The oil that flows into the main flow path 71 then flows into the back pressure chamber 100P from the orifice part 511.

In the example shown in FIG. 5A, it is easier for the oil in the back pressure chamber 100P to flow from the orifice flow path 851 of the orifice plate 85 to the inflow chamber 631. Consequently, the pressure of the oil in the back pressure chamber 100P is relatively low.

Here, as described above, the adjustment part 90 determines the pressure of the back pressure chamber 100P. Then, when a fluid pressure in the direction of opening not less than the force in the direction in which the main valve 51 closes the valve seat part 73 is applied to the main valve 51 of the main valve part 50, the main valve 51 comes off the valve seat part 73 to open the main flow path 71. At this time, the pressure of the back pressure chamber 100P determines the cross-sectional area of flow path, which is the gap between the main valve 51 and the valve seat part 73. In other words, the pressure of the back pressure chamber 100P determines the flow rate, namely, the damping force.

As shown in FIG. 5A, the oil that has flowed into the main flow path 71 flows through the gap between the valve seat part 73 and the main valve 51 while deforming the main valve 51 to separate from the valve seat part 73. In this case, in the main valve 51, the outer edge portion of the main valve 51 is displaced inward in the second axial direction with the first valve contact part 673 of the first housing 60 serving as a fulcrum. Here, the second housing 70 of the first exemplary embodiment includes the groove part 77 that is concaved inward in the second axial direction to be capable of relieving the displacement of the outer edge portion of the main valve 51. This allows the main valve 51 to be deformable without constraining the displacement of the outer edge portion.

Then, in the outer damping part 100 of the first exemplary embodiment, the damping force is generated by the differential pressure caused by narrowing the flow rate of the oil due to the gap between the main valve 51 and the valve seat part 73 of the second housing 70.

Thereafter, the oil, which has opened the main valve 51 and has flowed from the main flow path 71, flows through the outer flow paths 79, the in-housing flow paths 121, and the outer flow paths 112 in this order, and then flows into the reservoir chamber R.

On the other hand, as shown in FIG. 5B, the movement of the piston part 30 (refer to FIG. 1) in the axial direction causes the oil having flowed into the inner flow path 111 to flow into the main flow path 71.

The oil that flows into the main flow path 71 then flows into the back pressure chamber 100P from the orifice part 511.

Here, in the example shown in FIG. 5B, it is difficult for the oil in the back pressure chamber 100P to flow from the orifice flow path 851 of the orifice plate 85 to the inflow chamber 631. Consequently, the pressure of the oil in the back pressure chamber 100P is relatively high.

Then, the oil that has flowed into the main flow path 71 is going to flow through the gap between the valve seat part 73 and the main valve 51 while deforming the main valve 51 to separate from the valve seat part 73. However, in the example shown in FIG. 5B, the pressure of the back pressure chamber 100P is relatively high. Therefore, upon receiving the pressure of the back pressure chamber 100P, the main valve 51 is pressed toward the valve seat part 73 relatively strongly. Consequently, it becomes difficult for the main valve 51 to open the valve seat part 73 for allowing the oil in the main flow path 71 to flow. For this reason, the damping force generated in the outer damping part 100 in the state shown in FIG. 5B is relatively high.

Thereafter, the oil, which has opened the main valve 51 and has flowed from the main flow path 71, flows through the outer flow paths 79, the in-housing flow paths 121, and the outer flow paths 112 in this order, and then flows into the reservoir chamber R.

As described above, in the outer damping part 100 of the first exemplary embodiment, the magnitude of the damping force generated by the main valve 51 can be adjusted by changing the pressure of the oil in the back pressure chamber 100P by the adjustment part 90.

As described above, in the outer damping part 100 of the first exemplary embodiment, the force in the direction in which the main valve 51 closes the main flow path 71 is determined by the pressure of the oil in the back pressure chamber 100P, and is also determined by the spring force due to the external force of the main valve 51. Then, as shown in FIG. 3, different from the structure of the conventional art, the outer edge portion of the main valve 51 is supported by the valve seat part 73 of the second housing 70 and the first valve contact part 673 of the first housing 60, whose positions in the second axial direction are not affected by other components. The force in the direction of closing the main flow path 71 by the main valve 51 is determined by the relative position in the second axial direction of the valve seat part 73 and the first valve contact part 673. Therefore, if the tolerance of relative position of the first housing 60 and the second housing 70 is managed, the spring force due to the external force of the main valve 51 can also be managed at the same time; accordingly, the manufacturability is improved. The variation in the damping force of the outer damping part 100 of the first exemplary embodiment due to the individual difference is reduced.

Note that the management of the tolerance can be performed by measuring the relative position of the first valve contact part 673 of the first housing 60 and the valve seat part 73 of the second housing 70 using measuring equipment, for example, and managing the positional difference to be within the range that does not cause individual differences. As a method, an example can be shown in which the shim 80 of a specific thickness is selected from among the shims 80 with plural thicknesses so that the positional difference is within the range that does not cause individual differences. In addition, in the case where the shim 80 is not used, another example can be shown in which the first housing 60 and the second housing 70 are divided into plural groups in accordance with the size, and selectively engaged to fall within the range that does not cause individual differences. Still another example can be shown in which the joint position between the first housing 60 and the second housing 70 in the second axial direction is adjusted by the depth of press fitting or the screw fastening.

Second Exemplary Embodiment

Next, the hydraulic shock absorber 1 of the second exemplary embodiment will be described in detail. Note that, in the description of the second exemplary embodiment, configurations similar to those in the first exemplary embodiment are assigned with same reference signs, and detailed descriptions thereof will be omitted.

FIG. 6 is a perspective view of the outer damping part 100 in the second exemplary embodiment, which is also a partial cross-sectional view.

Figures 7A, 7B:
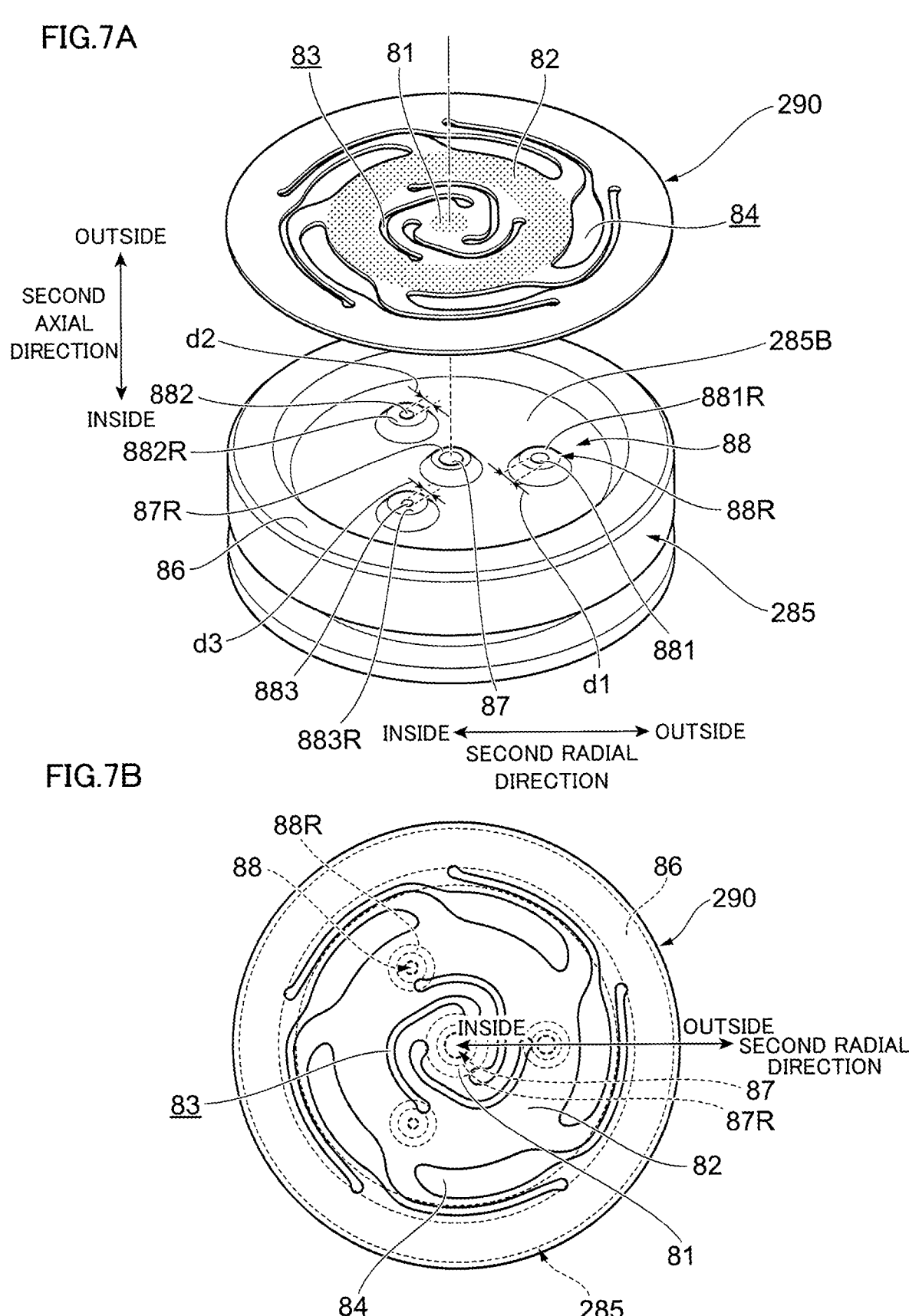
FIGS. 7A and 7B are illustration diagrams of an orifice plate and a pilot valve in the second exemplary embodiment.

FIGS. 7A and 7B are illustration diagrams of an orifice plate 285 and a pilot valve 290 in the second exemplary embodiment.

As shown in FIG. 6, the outer damping part 100 of the second exemplary embodiment includes: a main valve part 250 that controls the oil flow; the first housing 60 (an example of the first containing part); and a second housing 270 (an example of the second containing part) provided on an opposite side of the first housing 60 in the second axial direction. Furthermore, the outer damping part 100 of the second exemplary embodiment includes: the shim 80; the orifice plate 285 provided in the first housing 60; the pilot valve 290 provided outside the orifice plate 285 in the second axial direction; and the adjustment part 90. Then, similar to the first exemplary embodiment, the outer damping part 100 of the second exemplary embodiment includes the connection flow path part 110 and the outer housing 120 (refer to FIG. 2).

(Main Valve Part 250)

The main valve part 250 (an example of the valve body part) of the second exemplary embodiment includes: a main valve 252 (an example of the pressure receiving part) that mainly generates the damping force; and a plate spring 253 (an example of the elastic part) that supports the main valve 252 in the outer damping part 100.

The main valve 252 is a member formed into the disc-like shape. Then, the main valve 252 includes an orifice part 52F provided at the inside in the second radial direction, and a pressure receiving part 52R provided at the inside in the second axial direction. In addition, the main valve 252 includes a spring receiving part 52S that receives the plate spring 253. Furthermore, the main valve 252 includes a first facing part 521 provided outside the pressure receiving part 52R in the second radial direction, and a second facing part 522 provided outside the first facing part 521 in the second radial direction.

The cross-sectional area of flow path of the orifice part 52F is formed sufficiently small as compared to, for example, the main flow path 71. Then, the orifice part 52F makes it possible for the oil to flow from the main flow path 71 to the back pressure chamber 100P even though the main valve 252 contacts a first valve seat part 273 or a second valve seat part 274, which will be described later, to close the main flow path 71.

The pressure receiving part 52R is provided to face the main flow path 71. Then, the pressure receiving part 52R forms a portion for receiving the pressure of the oil flowing into the main flow path 71. The main valve 252 receives the pressure of the oil at the pressure receiving part 52R, to thereby displace outwardly in the second axial direction while elastically deforming the plate spring 253.

The spring receiving part 52S is an annular surface facing outward in the second axial direction. The spring receiving part 52S is located inside the plate spring 253 in the second axial direction. Then, the spring receiving part 52S supports the inside of the plate spring 253 in the second axial direction.

The first facing part 521 is formed to annularly protrude inward in the second axial direction. Then, the first facing part 521 is opposed to the first valve seat part 273, which will be described later, of the second housing 270.

The second facing part 522 is formed to annularly protrude inward in the second axial direction. Then, the second facing part 522 is opposed to the second valve seat part 274, which will be described later, of the second housing 270.

The first facing part 521 and the second facing part 522 opens and closes the first valve seat part 273 and the second valve seat part 274 to be described later, respectively, to thereby control the flow rate of the oil flowing through the main flow path 71 and generate the differential pressure. This causes the main valve 252 to generate the damping force of the hydraulic shock absorber 1.

The plate spring 253 is formed into relatively thin plate shape, which is substantially circular. That is, the plate spring 253 is formed into substantially a disc shape. In addition, as a material of the plate spring 253, for example, metal such as iron can be used. The plate spring 253 is then configured to be elastically deformable.

The plate spring 253 includes an opening part 53H that opens at the inside in the second radial direction. Part of the main valve 252 is inserted into the opening part 53H.

Then, the plate spring 253 is supported by the first housing 60 and the second housing 270 at an outer edge portion, which is at the outside in the second radial direction.

(Second Housing 270)

The second housing 270 of the second exemplary embodiment includes: the main flow path 71 through which the oil flows; the first valve seat part 273 provided at the end portion at the outside in the second axial direction of the main flow path 71; and the second valve seat part 274 provided outside the first valve seat part 273 in the second radial direction. The second housing 270 also includes: the second shim contact part 74; the second valve contact part 75; the second connection part 76; the groove part 77; and the outer flow paths 79.

The first valve seat part 273 is formed to annularly protrude outward in the second axial direction. Then, the first valve seat part 273 forms a contact portion with the first facing part 521 of the main valve 252.

In addition, the second valve seat part 274 is formed to annularly protrude outward in the second axial direction. Then, the second valve seat part 274 forms a contact portion with the second facing part 522 of the main valve 252. Note that, in the exemplary embodiment, the protruding height of the second valve seat part 274 is substantially the same as the first valve seat part 273.

Then, between the first valve seat part 273 and the second valve seat part 274, each protruding outward in the second axial direction, and the first facing part 521 and the second facing part 522, an annular space 275, which is formed annularly and concaved inward in the second axial direction, is formed.

Furthermore, the first valve seat part 273 includes plural groove parts 273T formed along the second radial direction. The cross-sectional area of the oil flow path in each of the groove parts 273T is formed relatively small. In other words, the groove parts 273T constitute the so-called orifice. Then, each of the groove parts 273T forms a route through which the oil flows from the inside toward the outside in the second radial direction of the first valve seat part 273 in the state where the first facing part 521 of the main valve 252 is in contact with the first valve seat part 273. That is, each of the groove parts 273T allows the oil in the main flow path 71 to flow into the annular space 275 between the first valve seat part 273 and the second valve seat part 274 in the state where the main valve 252 is in contact with the first valve seat part 273.

(Orifice Plate 285)

As shown in FIG. 7A, the orifice plate 285 includes: an outer seat part 86 provided at the outside in the second radial direction; and an inner pilot flow path 87 and plural outer pilot flow paths 88 constituting the oil flow path for adjusting the pressure of the oil in the back pressure chamber 100P (refer to FIG. 6).

The outer seat part 86 annularly protrudes from a bottom surface part 285B, which is substantially a circular-shaped surface provided at the outside in the second axial direction, outwardly in the second axial direction. Then, the outer seat part 86 supports the outer edge portion of the pilot valve 290.

The inner pilot flow path 87 is provided at the inside in the second radial direction of the pilot valve 290. The inner pilot flow path 87 is then provided to penetrate through the orifice plate 285 in the second axial direction. In addition, the inner pilot flow path 87 has an inner round 87R that forms a contact portion with the pilot valve 290 at the outside in the second axial direction.

The orifice plate 285 of the second exemplary embodiment is provided with the plural outer pilot flow paths 88. Specifically, the orifice plate 285 of the second exemplary embodiment includes a first outer pilot flow path 881; a second outer pilot flow path 882; and a third outer pilot flow path 883. Note that, in the following description, the first outer pilot flow path 881, the second outer pilot flow path 882, and the third outer pilot flow path 883 are collectively referred to as the outer pilot flow paths 88, when not distinguished from one another.

Then, each outer pilot flow path 88 has an outer round 88R that forms a contact portion with the pilot valve 290 at the outside in the second axial direction.

In the plural outer pilot flow paths 88, the heights of the respective outer rounds 88R are substantially the same when the bottom surface part 285B is referenced.

The heights of the outer rounds 88R of the plural outer pilot flow paths 88 are lower than the height of the inner round 87R of the inner pilot flow path 87.

Furthermore, in the orifice plate 285 of the second exemplary embodiment, the inner diameters of flow path ports of the plural outer pilot flow paths 88 are different from one another. In other words, the plural outer pilot flow paths 88 have different flow path cross-sectional areas of the flow path ports through which the oil flows.

Specifically, as shown in FIG. 7A, the inner diameter d1 of the flow path port of the first outer pilot flow path 881 is larger than the inner diameter d2 of the flow path port of the second outer pilot flow path 882 and the inner diameter d3 of the flow path port of the third outer pilot flow path 883. In addition, the inner diameter d2 of the flow path port of the second outer pilot flow path 882 is larger than the inner diameter d3 of flow path port of the third outer pilot flow path 883. In other words, the flow path cross-sectional areas of the flow path ports of the plural outer pilot flow paths 88 increase in the order of the third outer pilot flow path 883, the second outer pilot flow path 882, and the first outer pilot flow path 881.

In addition, the flow path cross-sectional area of the flow path port of each outer pilot flow path 88 is smaller than the flow path cross-sectional area of the flow path port of the inner pilot flow path 87.

—Pilot Valve 290—

As shown in FIG. 7A, the pilot valve 290 is substantially a circular plate-like member that elastically deforms. As a material of the pilot valve 290, for example, metal such as iron can be used. The pilot valve 290 is then provided to face the outside in the second axial direction of the orifice plate 285.

The pilot valve 290 includes a first facing part 81 that faces the inner pilot flow path 87 and a second facing part 82 that faces the outer pilot flow paths 88. Furthermore, the pilot valve 290 includes inner opening parts 83 that allow the pilot valve 290 to easily deform in the second axial direction, and outer opening parts 84, which are provided outside the inner opening parts 83 in the second radial direction, that also allow the pilot valve 290 to easily deform in the second axial direction.

As shown in FIG. 7B, the first facing part 81 is formed into a circular shape and a plate-like shape. The first facing part 81 can cover the inner round 87R.

The second facing part 82 is formed into an annular shape and a plate-like shape. The second facing part 82 can cover the outer rounds 88R.

Then, in the second exemplary embodiment, via the pilot valve 290, the adjustment valve 91 of the adjustment part 90 adjusts the flow rate of oil flowing through the inner pilot flow path 87 and the outer pilot flow paths 88. Furthermore, the adjustment valve 91 adjusts the pressure of the oil in the back pressure chamber 100P.

Subsequently, the operation of the orifice plate 285 and the pilot valve 290 of the second exemplary embodiment will be described.

In the main valve part 250 shown in FIG. 6, the openability of the main flow path 71 is determined in accordance with the pressure of the oil in the back pressure chamber 100P. Furthermore, when the main valve part 250 opens the main flow path 71, the oil in the back pressure chamber 100P flows into the inflow chamber 631 from the inner pilot flow path 87 and the plural outer pilot flow paths 88.

Here, the pilot valve 290 is more deformable at the portion where the pressure receiving area is larger. Consequently, the oil flowing through each outer pilot flow paths 88 flows out of the first outer pilot flow path 881, the second outer pilot flow path 882, and the third outer pilot flow path 883 in this order with time differences while opening the pilot valve 290. In addition, finally, the oil flowing through the inner pilot flow path 87 opens the pilot valve 290 to flow into the inflow chamber 631.

Then, in the outer damping part 100 of the second exemplary embodiment, the oil pressure in the back pressure chamber 100P changes in a stepwise manner, as compared to the case of the single orifice flow path 851 as in the first exemplary embodiment, for example. The stepwise change in the oil pressure in the back pressure chamber 100P causes the main valve part 250 to open the main flow path 71 in the stepwise manner, not at once.

In the outer damping part 100 of the second exemplary embodiment configured as described above, the basic flow of the oil that opens the main valve part 250 is similar to the above-described first exemplary embodiment.

Here, in the outer damping part 100 of the second exemplary embodiment, the second housing 270 includes the first valve seat 273 and the second valve seat 274. Furthermore, in the second housing 270, the first valve seat part 273 has the plural groove parts.

This causes, in the outer damping part 100 in the second exemplary embodiment, the pressure receiving area of the main valve part 250 for the oil flowing through the main flow path 71 to change in the stepwise manner. Then, in the main valve part 250 of the second exemplary embodiment, the damping force characteristics, in which the damping force when the main valve 252 is opened and the oil flows in the main flow path 71 changes in the stepwise manner, not rapidly, can be obtained.

As described above, also in the outer damping part 100 of the second exemplary embodiment, the force by the plate spring 253 in the direction in which the main valve 252 closes the main flow path 71 is determined by relative positions between the first valve seat part 273 and the second valve seat 274 and the first valve contact part 673 in the second axial direction. Therefore, if the tolerance of relative position of the first housing 60 and the second housing 270 is managed, the spring force due to the external force of the main valve 252 can also be managed at the same time; accordingly, the manufacturability is improved. The variation in the damping force of the outer damping part 100 of the second exemplary embodiment due to the individual difference is reduced.

Third Exemplary Embodiment

Next, the hydraulic shock absorber 1 of the third exemplary embodiment will be described in detail. Note that, in the description of the third exemplary embodiment, configurations similar to those in other exemplary embodiments are assigned with same reference signs, and detailed descriptions thereof will be omitted.

Figure 8:
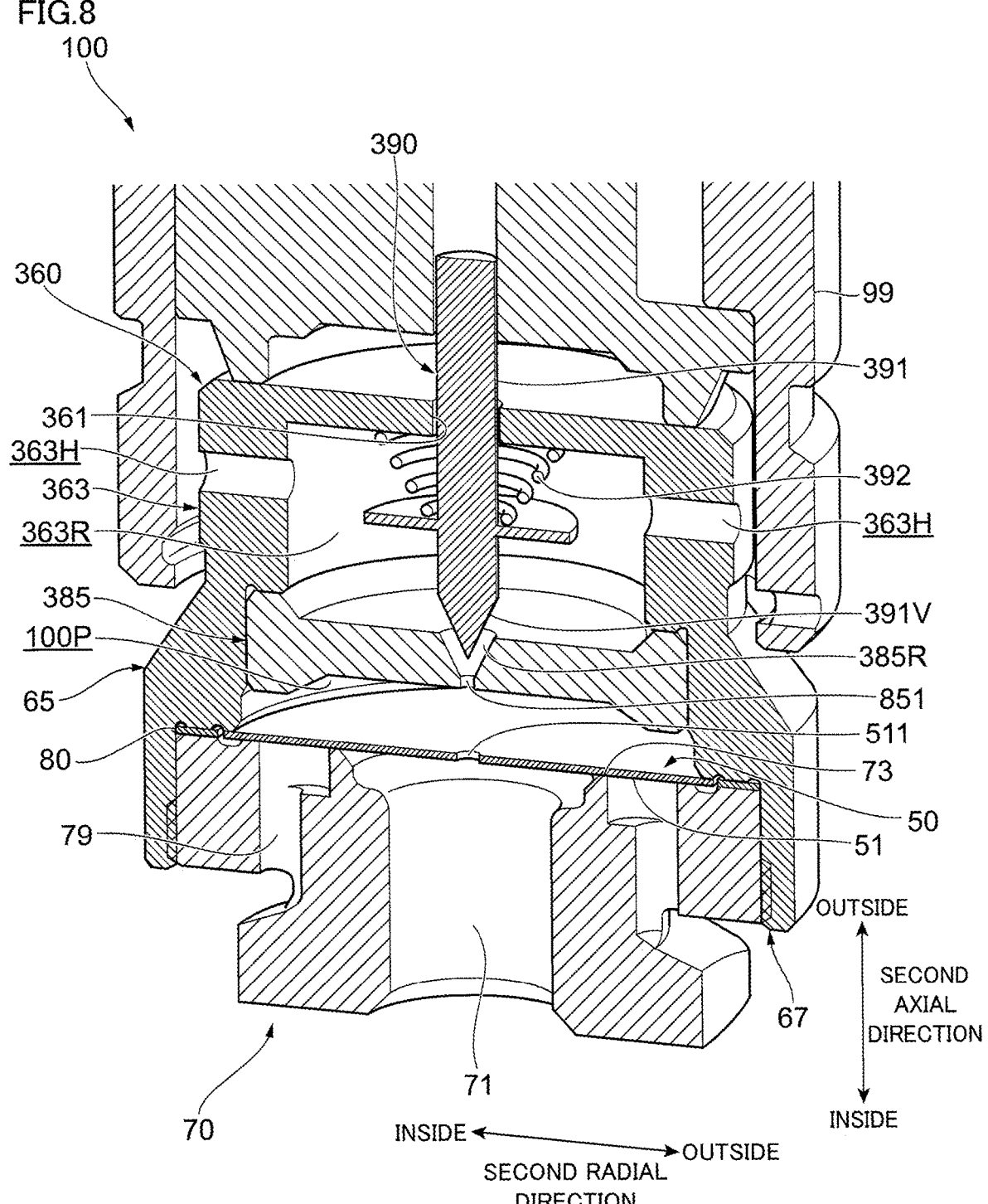
FIG. 8 is a perspective view of an outer damping part in a third exemplary embodiment, which is also a partial cross-sectional view.

FIG. 8 is a perspective view of the outer damping part 100 in the third exemplary embodiment, which is also a partial cross-sectional view.

As shown in FIG. 8, the outer damping part 100 of the third exemplary embodiment includes: the main valve part 50 that controls the oil flow; a first housing 360 (an example of the first containing part); and the second housing 70 (an example of the second containing part) provided on an opposite side of the first housing 360 in the second axial direction. Furthermore, the outer damping part 100 of the third exemplary embodiment includes: the shim 80; an orifice plate 385 provided in the first housing 360; and an adjustment part 390 that adjusts the back pressure of the back pressure chamber 100P. Then, similar to the first exemplary embodiment, the outer damping part 100 of the third exemplary embodiment includes the connection flow path part 110 and the outer housing 120 (refer to FIG. 2).

(First Housing 360)

The first housing 360 includes: an opening part 361 provided at the outside in the second axial direction; a containing part 363 containing a push rod 391, which will be described later, of the adjustment part 390; the holding part 65; and the facing part 67.

The opening part 361 supports the push rod 391, which will be described later, of the adjustment part 390 movably along the second axial direction.

The containing part 363 contains the push rod 391, which will be described later, and a compression coil spring 392 of the adjustment part 90 inside thereof. In addition, the containing part 363 forms an inflow chamber 363R, into which the oil flowing through the orifice flow path 851 of the orifice plate 385 flows. Furthermore, the containing part 363 has plural through holes 363H that penetrate along the second radial direction. The through hole 363H connects the inflow chamber 363R to the in-housing flow path 121 to be described later (refer to FIG. 2).

(Orifice Plate 385)

The orifice plate 385 is formed into substantially a circular and plate-like shape. The orifice plate 385 is then press fit into the inside of the first housing 360 and held by the holding part 65.

In addition, the orifice plate 385 includes: the orifice flow path 851 through which the oil flows; and a valve facing part 385R provided at the outside in the second axial direction of the orifice flow path 851.

The valve facing part 385R is formed by a cone-shaped opening. The valve facing part 385R connects to the orifice flow path 851. In addition, the valve facing part 385R is provided to face the push rod 391 to be described later.

(Adjustment Part 390)

The adjustment part 390 includes the push rod 391 that controls the flow of oil in the orifice flow path 851 and the compression coil spring 392 provided between the push rod 391 and the first housing 360.

The push rod 391 is a rod-like member extending long in the second axial direction. The push rod 391 is supported by the first housing 360 movably in the second axial direction. In addition, the push rod 391 has a valve part 391V formed into a cone shape at the end portion of the inside in the second axial direction thereof. The push rod 391 then adjusts the flow rate of the oil flowing through the orifice flow path 851 by changing the distance between the valve part 391V and the valve facing part 385R.

The compression coil spring 392 is engaged in the push rod 391 at the inside in the second axial direction, and contacts the first housing 360 at the outside in the second axial direction. Then, the compression coil spring 392 applies a spring force, which causes the push rod 391 to approach the valve facing part 385R, to the push rod 391.

In the outer damping part 100 of the third exemplary embodiment configured as described above, the basic flow of the oil is similar to the above-described first exemplary embodiment.

However, the outer damping part 100 of the third exemplary embodiment, adjustment of the oil pressure in the back pressure chamber 100P by the adjustment part 390 is different from the other exemplary embodiments. In the outer damping part 100P of the third exemplary embodiment, the push rod 391 operates in response to the oil flow in the orifice flow path 851, to thereby adjust the oil pressure in the back pressure chamber 100P.

In the outer damping part 100, when the flow rate of the oil in the orifice flow path 851 is relatively large, the push rod 391 compresses the compression coil spring 392 to be displace outwardly in the second axial direction. In other words, the distance between the valve part 391V and the valve facing part 385R is relatively long. Then, it becomes easier for the oil in the back pressure chamber 100P to flow into the inflow chamber 363R through the orifice flow path 851. As a result, the back pressure in the back pressure chamber 100P becomes relatively low. With this, it becomes easier for the main valve 51 to open the main flow path 71.

On the other hand, in the outer damping part 100, in the case where the flow rate of oil in the orifice flow path 851 is relatively small, the distance between the valve part 391V and the valve facing part 385R is relatively short. Then, it becomes difficult for the oil in the back pressure chamber 100P to flow into the inflow chamber 363R. As a result, the back pressure of the oil in the back pressure chamber 100P becomes relatively high. With this, it becomes difficult for the main valve 51 to open the main flow path 71.

As described above, to adjust the oil pressure in the back pressure chamber 100P, the adjustment part 390 of the outer damping part 100 in the third exemplary embodiment mechanically adjusts the oil pressure in response to the flow rate of the oil, not electronically as in the adjustment part 90 in other exemplary embodiments, for example.

In addition, in the outer damping part 100 of the third exemplary embodiment, by changing the specification of the compression coil spring 392, the oil pressure of the back pressure chamber 100P according to the flow rate of the oil in the orifice flow path 851 can be set with ease.

Then, also in the outer damping part 100 of the third exemplary embodiment configured as described above, if the tolerance of relative position of the first housing 360 and the second housing 70 is managed, the spring force due to the external force of the main valve 51 can also be managed at the same time; accordingly, the manufacturability is improved. The variation in the damping force of the outer damping part 100 of the third exemplary embodiment due to the individual difference is reduced.

Fourth Exemplary Embodiment

Next, the hydraulic shock absorber 1 of the fourth exemplary embodiment will be described in detail. Note that, in the description of the fourth exemplary embodiment, configurations similar to those in other exemplary embodiments are assigned with same reference signs, and detailed descriptions thereof will be omitted.

Figure 9:
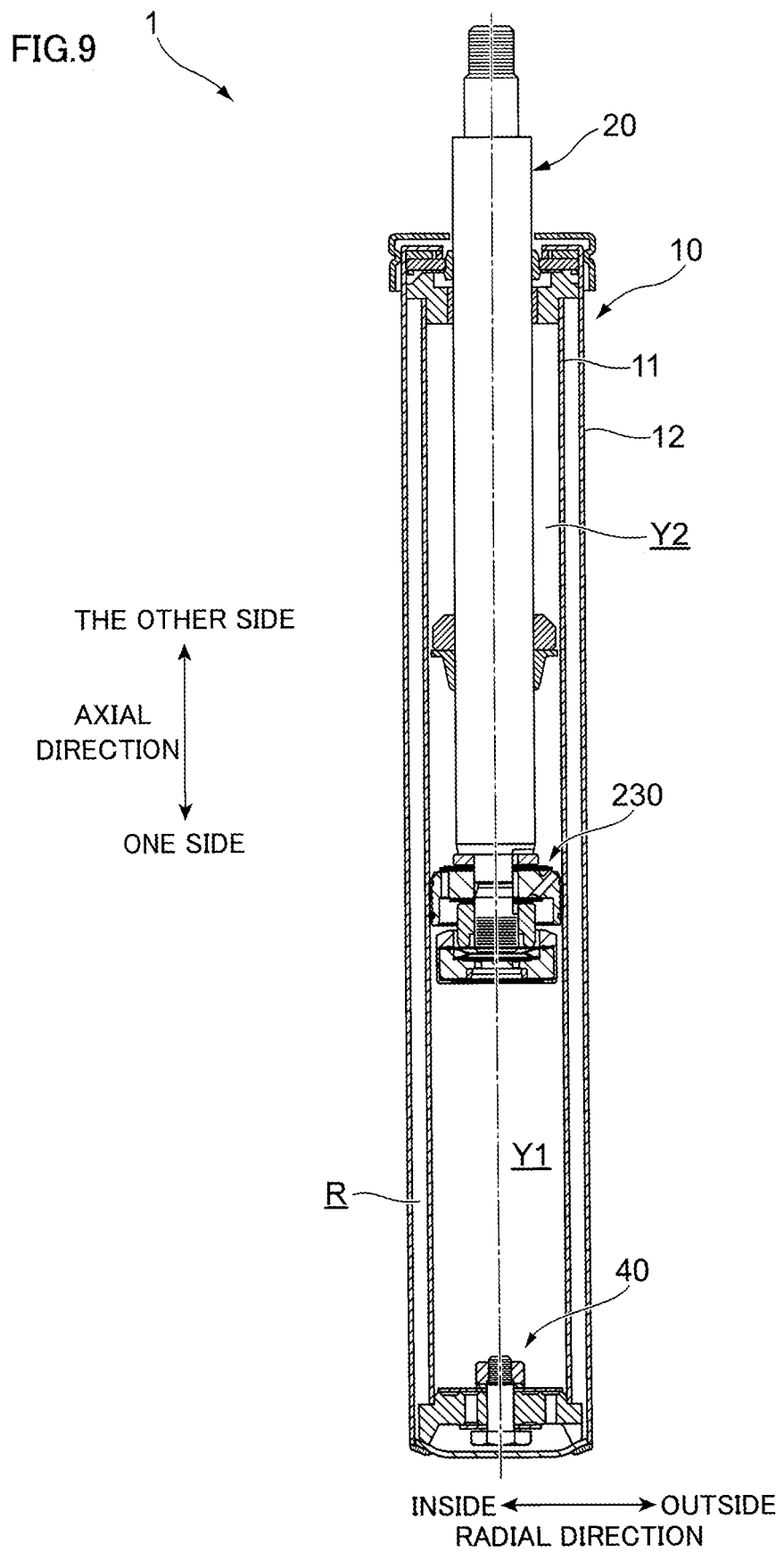
FIG. 9 is an overall view of a hydraulic shock absorber in a fourth exemplary embodiment.

FIG. 9 is an overall view of the hydraulic shock absorber 1 in the fourth exemplary embodiment.

Figure 10:
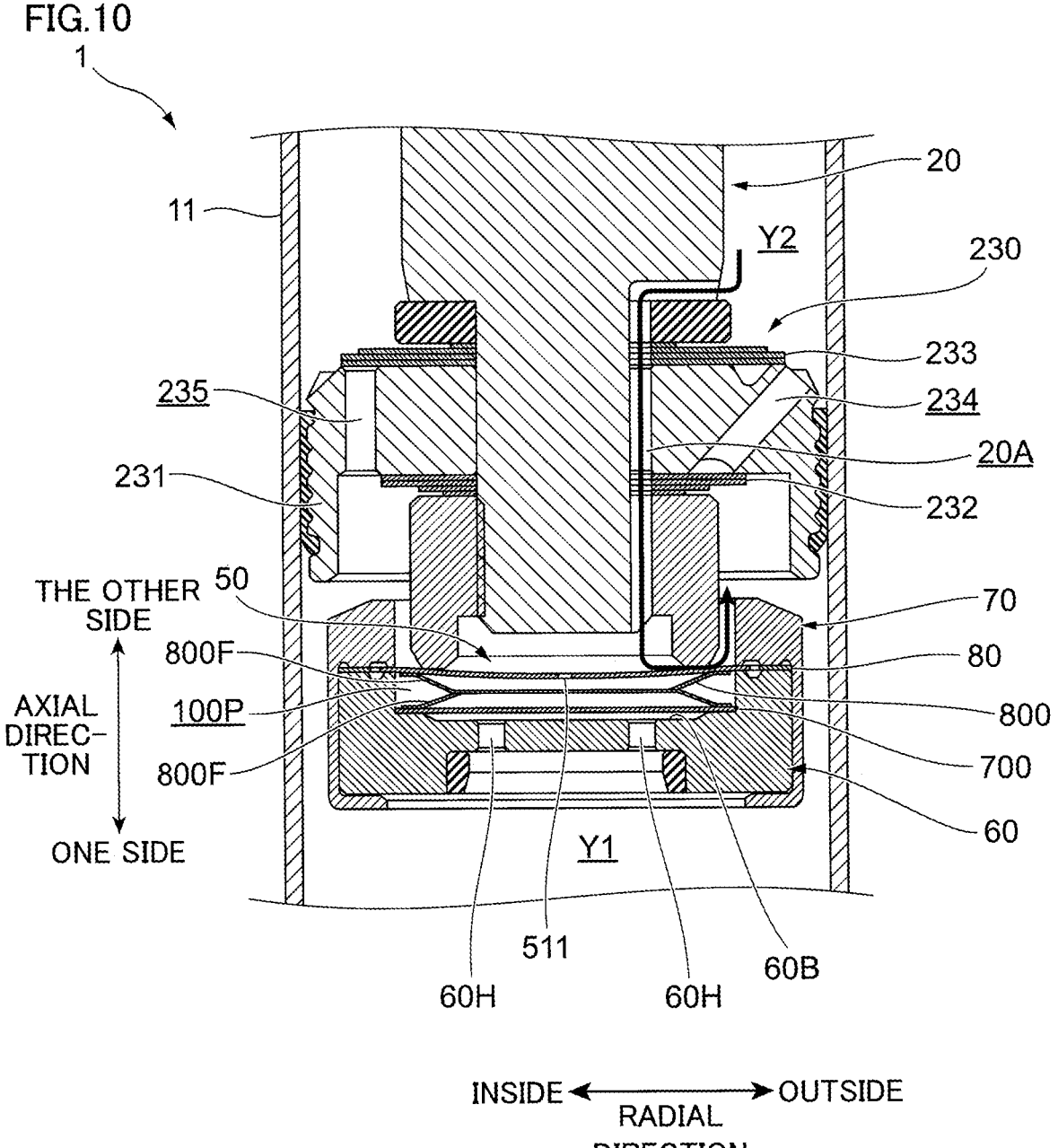
FIG. 10 is a cross-sectional view of a piston part in the fourth exemplary embodiment.

FIG. 10 is a cross-sectional view of a piston part 230 of the fourth exemplary embodiment.

As shown in FIG. 9, the hydraulic shock absorber 1 of the fourth exemplary embodiment includes the piston part 230 at the inside of the cylinder part 10 and at one side in the axial direction of the rod 20. Note that the basic configuration of the piston part 230 of the fourth exemplary embodiment is similar to the main valve part 50, the first housing 60, and the second housing 70 in the first exemplary embodiment. Hereinafter, description will be given specifically.

As shown in FIG. 10, the piston part 230 includes: a piston body 231; a first valve 232 provided at one side in the piston body 231; and a second valve 233 provided at the other side in the piston body 231.

When oil flows from the second oil chamber Y2 to the first oil chamber Y1 through a first oil path 234 at the time when the rod 20 moves toward the other side in the axial direction, the first valve 232 generates a differential pressure by reducing the flow rate of the oil in the first oil path 234. On the other hand, when oil flows from the first oil chamber Y1 to the second oil chamber Y2 through a second oil path 235 at the time when the rod 20 moves toward the one side in the axial direction, the second valve 233 generates a differential pressure by reducing the flow rate of the oil in the second oil path 235.

Furthermore, the piston part 230 includes the main valve part 50, the first housing 60, the second housing 70, and the shim 80. In addition, the piston part 230 includes a flexible valve 700 that is provided in the back pressure chamber 100P and flexes, and a holding valve 800 that holds each of the main valve part 50 and the flexible valve 700.

The flexible valve 700 is a plate-shaped elastic member. The flexible valve 700 is deformable in accordance with the pressure of the back pressure chamber 100P.

The holding valve 800 is an elastic member. Then, the holding valve 800 includes plural leg parts 800F that protrude toward the one side and the other side in the axial direction. The holding valve 800 is provided between the main valve 51 and the flexible valve 700. The holding valve 800 then holds the main valve 51 and the flexible valve 700 by the leg parts 800F.

Note that the piston part 230 of the fourth exemplary embodiment does not necessarily have to include the holding valve 800. On the other hand, in the case where the holding valve 800 is provided in the piston part 230, the leg parts 800F may contact the first housing 60 without contacting the main valve 51, for example.

Furthermore, as shown in FIG. 10, the rod 20 of the fourth exemplary embodiment includes a bypass oil path 20A inside thereof. The bypass oil path 20A is a flow path corresponding to the main flow path 71 of the first exemplary embodiment. The bypass oil path 20A passes the inside in the radial direction of the second housing 70, and then faces the surface facing the other side in the axial direction of the main valve 51.

In the hydraulic shock absorber 1 of the fourth exemplary embodiment configured as described above, when the rod 20 moves toward the other side in the axial direction, the oil in the second oil chamber Y2 flows into the other side in the axial direction of the main valve 51 through the bypass oil path 20A. Part of the oil flows into the back pressure chamber 100P through the orifice part 511 of the main valve 51.

The flexible valve 700 then flexes up to the deformation limit in response to the pressure of the back pressure chamber 100P, to thereby act not to increase the pressure of the back pressure chamber 100P. Note that, for example, the deformation limit of the flexible valve 700 is the state in which the flexible valve 700 contacts a bottom surface part 60B of the first housing 60. In addition, when the flexible valve 700 flexes toward the bottom surface part 60B, the oil on one side in the axial direction of the flexible valve 700 flows from through holes 60H toward the first oil chamber Y1.

Thus, since the pressure of the back pressure chamber 100P is kept low until the flexible valve 700 reaches the deformation limit, the back pressure applied to the main valve 51 is low. Then, since the back pressure is not applied to the main valve 51, it becomes easier to open the main valve 51 by the oil flowing through the bypass oil path 20A. In this state, the damping force generated in the main valve 51 is relatively low.

On the other hand, upon fully flexing up to the deformation limit, the flexible valve 700 receives high pressure of the back pressure chamber 100P. As a result, since the back pressure applied to the main valve 51 is high, it becomes difficult to open the main valve 51 by the oil flowing through the bypass oil path 20A. In this state, the damping force generated in the main valve 51 is relatively high.

Note that, in the hydraulic shock absorber 1 of the fourth exemplary embodiment configured as described above, when the rod 20 moves toward the one side in the axial direction, the flexible valve 700 is deformed toward the other side by the oil flowing from the first oil chamber Y1 into the through holes 60H. In addition, the main valve 51 is pressed against the second housing 70.

Also in the piston part 230 of the fourth exemplary embodiment configured as described above, if the tolerance of relative position of the first housing 60 and the second housing 70 is managed, the spring force due to the external force of the main valve 51 can also be managed at the same time; accordingly, the manufacturability is improved. The variation in the damping force of the piston part 230 of the fourth exemplary embodiment due to the individual difference is reduced.

Modified Example

Subsequently, the outer damping part 100 of a modified example will be described.

For example, in the first exemplary embodiment, the orifice plate 85 shown in FIG. 2 may have a protrusion part at the end portion on the outside in the second radial direction of the orifice plate 85, the protrusion part cylindrically protruding inward in the second axial direction. Then, the orifice plate 85 may also allow the protrusion part protruding cylindrically to contact the outer edge portion of the main valve 51. Consequently, the orifice plate 85 may constitute part of the back pressure chamber 100P and may support the outer edge portion of the main valve 51.

Note that, in the above-described exemplary embodiments, the shim 80 is configured separately from the first housing 60 and the second housing 70; however, the shim 80 may be configured integrally with the first housing 60 or the second housing 70.

In addition, for example, the second valve contact part 75 of the second housing 70 may be configured to be always in contact with the main valve 51, or may be configured to contact the main valve 51 when the main valve 51 is flexed for a predetermined amount inwardly in the second axial direction by the pressure of the back pressure chamber 100P.

In addition, the second valve contact part 75 of the second housing 70 may be configured with a separate component. The separate component in this case may be, for example, configured to have an annular part formed annularly and plural arm parts protruding inward in the second radial direction from the annular part. The arm part of the separate component may be in a form extending inward in the second radial direction while tapering. In this case, for example, the outer edge portion of the main valve 51 becomes deformable inwardly in the second axial direction. Then, the main valve 51 can be flexed with ease. As a result, the lower limit of the valve-opening pressure of the main valve 51 is lowered, and thereby it becomes possible to widen the adjustment range of the damping force.

Note that, in the first exemplary embodiment, the second exemplary embodiment, the third exemplary embodiment, the fourth exemplary embodiment, and the modified example described above, all or part of the configurations described in one exemplary embodiment may be applied to or combined with other exemplary embodiments.

REFERENCE SIGNS LIST

1 Hydraulic shock absorber
11 Cylinder

20 Rod
30 Piston part
50 Main valve part
51 Main valve
60 First housing
70 Second housing
71 Main flow path
73 Valve seat part
75 Second valve contact part
80 Shim
85 Orifice plate
90 Adjustment part
100 Outer damping part
100P Back pressure chamber
230 Piston part
673 First valve contact part

The invention claimed is:

1. A damping force generation mechanism with a flow path inside thereof, through which a fluid flows, the mechanism comprising:

a valve body part including an elastic part that is elastically deformable and a pressure receiving part that receives pressure of the fluid;

a valve seat part provided around a flow path port of the flow path, with which the pressure receiving part is able to make contact;

a first containing part constituting at least a part of a back pressure chamber applying a back pressure toward the valve seat part against the valve body part, the first containing part supporting an outer edge portion of the elastic part;

a contact part provided outside the valve seat part, the contact part being able to make contact with the elastic part of the valve body part; and a concave part provided outside the contact part, the concave part making the outer edge portion of the elastic part displaceable away from the back pressure chamber.

2. The damping force generation mechanism according to claim 1, wherein the elastic part of the valve body part is supported by the first containing part and the valve seat part.

3. The damping force generation mechanism according to claim 2, wherein the valve seat part is provided in a second containing part, which is provided on an opposite side of the first containing part with respect to the valve body part and contains at least the valve body part.

4. The damping force generation mechanism according to claim 2, wherein the contact part is provided in a second containing part, which is provided on an opposite side of the first containing part with respect to the valve body part and contains at least the valve body part.

5. The damping force generation mechanism according to claim 2, wherein a setting part provided between the first containing part and a second containing part, which is provided on an opposite side of the first containing part with respect to the valve body part and contains at least the valve body part, to determine a spacing between the first containing part and the second containing part.

6. The damping force generation mechanism according to claim 2, wherein the valve body part includes the elastic part and the pressure receiving part that are configured in one piece.

7. The damping force generation mechanism according to claim 1, wherein the valve seat part is provided in a second containing part, which is provided on an opposite side of the first containing part with respect to the valve body part and contains at least the valve body part.

8. The damping force generation mechanism according to claim 7, wherein the contact part is provided in a second containing part, which is provided on an opposite side of the first containing part with respect to the valve body part and contains at least the valve body part.

9. The damping force generation mechanism according to claim 7, wherein a setting part provided between the first containing part and a second containing part, which is provided on an opposite side of the first containing part with respect to the valve body part and contains at least the valve body part, to determine a spacing between the first containing part and the second containing part.

10. The damping force generation mechanism according to claim 7, wherein the valve body part includes the elastic part and the pressure receiving part that are configured in one piece.

11. The damping force generation mechanism according to claim 1, wherein the contact part is provided in a second containing part, which is provided on an opposite side of the first containing part with respect to the valve body part and contains at least the valve body part.

12. The damping force generation mechanism according to claim 11, wherein a setting part provided between the first containing part and a second containing part, which is provided on an opposite side of the first containing part with respect to the valve body part and contains at least the valve body part, to determine a spacing between the first containing part and the second containing part.

13. The damping force generation mechanism according to claim 11, wherein the valve body part includes the elastic part and the pressure receiving part that are configured in one piece.

14. The damping force generation mechanism according to claim 1, wherein a setting part provided between the first containing part and a second containing part, which is provided on an opposite side of the first containing part with respect to the valve body part and contains at least the valve body part, to determine a spacing between the first containing part and the second containing part.

15. The damping force generation mechanism according to claim 14, wherein the valve body part includes the elastic part and the pressure receiving part that are configured in one piece.

16. The damping force generation mechanism according to claim 1, wherein the valve body part includes the elastic part and the pressure receiving part that are configured in one piece.

17. A pressure shock absorber comprising:

a cylinder containing fluid;

a piston part connected to a rod that moves in an axial direction, and moving inside the cylinder;

a flow path forming part forming, with movement of the piston part, a flow path through which the fluid flows;

a valve body part including an elastic part that is elastically deformable and a pressure receiving part that receives pressure of the fluid;

a valve seat part provided around a flow path port of the flow path, with which the pressure receiving part is able to make contact;

a first containing part constituting at least a part of a back pressure chamber applying a back pressure toward the valve seat part against the valve body part, the first containing part supporting an outer edge portion of the elastic part;

a contact part provided outside the valve seat part, the contact part being able to make contact with the elastic part of the valve body part; and a concave part provided outside the contact part, the concave part making the outer edge portion of the elastic part displaceable away from the back pressure chamber.

*   *   *   *   *